(12) United States Patent
Nakano

(10) Patent No.: US 10,044,683 B2
(45) Date of Patent: Aug. 7, 2018

(54) CONTENT TRANSMISSION AND RECEPTION DEVICE COMPATIBLE TO SWITCH TO A NEW ENCRYPTION SCHEME

(71) Applicant: SONY CORPORATION, Tokyo (JP)

(72) Inventor: Takehiko Nakano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 20 days.

(21) Appl. No.: 14/900,317

(22) PCT Filed: Apr. 30, 2014

(86) PCT No.: PCT/JP2014/062018
§ 371 (c)(1),
(2) Date: Dec. 21, 2015

(87) PCT Pub. No.: WO2015/008521
PCT Pub. Date: Jan. 22, 2015

(65) Prior Publication Data
US 2016/0149868 A1    May 26, 2016

(30) Foreign Application Priority Data
Jul. 19, 2013 (JP) ................................ 2013-151075

(51) Int. Cl.
*H04L 9/00* (2006.01)
*H04L 29/06* (2006.01)
(Continued)

(52) U.S. Cl.
CPC .......... *H04L 63/0428* (2013.01); *G06F 21/10* (2013.01); *H04L 9/16* (2013.01);
(Continued)

(58) Field of Classification Search
CPC ... G06F 21/10; H04L 63/0428; H04L 63/061; H04L 63/0823; H04L 63/0869; H04L 63/105; H04L 9/16
See application file for complete search history.

(56) References Cited

U.S. PATENT DOCUMENTS 7,742,438 B1 * 6/2010 Xu ........................ H04L 1/1671
370/278
8,074,290 B2 * 12/2011 Nakano ................. H04L 9/0844
726/31
(Continued)

FOREIGN PATENT DOCUMENTS

JP    2006-094241 A    4/2006
JP    2008-066834 A    3/2008
(Continued)

OTHER PUBLICATIONS

Diaz-Sanchez, Daniel, et al. "DLNA, DVB-CA and DVB-CPCM integration for commercial content management." IEEE Transactions on Consumer Electronics 56.1 (2010): 79-87.*

*Primary Examiner* — Michael Simitoski
(74) *Attorney, Agent, or Firm* — Chip Law Group

(57) ABSTRACT

The disclosure is directed to reduce a load of time and cost at the time of transition to a safer system in which an encryption scheme is newly set. By allowing a device of a transition step which implements a predetermined security reinforcement measure to handle high-value content only for a given system transition period, a problem of a time necessary for the transition can be avoided and the transition to the safer system can be performed smoothly. The device mentioned herein which implements the predetermined security reinforcement measure is, for example, a device which supports only an existing encryption algorithm and (Continued)

for which security of a weaker portion other than the encryption scheme is ensured.

19 Claims, 25 Drawing Sheets

(51) Int. Cl.
  *H04L 9/16* (2006.01)
  *G06F 21/10* (2013.01)
(52) U.S. Cl.
  CPC ........ *H04L 63/061* (2013.01); *H04L 63/0869* (2013.01); *H04L 63/105* (2013.01); *H04L 63/0823* (2013.01)

(56) References Cited

U.S. PATENT DOCUMENTS

| | | | | |
|---|---|---|---|---|
| 2002/0116501 A1* | 8/2002 | Ho | ................ | H04L 12/4633 709/227 |
| 2003/0135730 A1* | 7/2003 | Szucs | ................ | G06F 21/10 713/153 |
| 2005/0071631 A1* | 3/2005 | Langer | ................ | H04L 9/0833 713/156 |
| 2006/0120520 A1* | 6/2006 | Suzuki | ................ | G06F 21/602 380/28 |
| 2006/0143701 A1* | 6/2006 | Dos Santos | ......... | H04L 63/0428 726/14 |
| 2006/0265733 A1* | 11/2006 | Chen | ................ | G06F 21/71 726/1 |
| 2007/0058814 A1 | 3/2007 | Robinson | | |
| 2007/0091359 A1* | 4/2007 | Suzuki | ................ | H04N 7/1675 358/1.15 |
| 2007/0162753 A1* | 7/2007 | Nakano | ................ | H04L 9/0844 713/171 |
| 2007/0206537 A1* | 9/2007 | Cam-Winget | ........ | H04L 63/162 370/331 |
| 2008/0192935 A1* | 8/2008 | Saito | ................ | G06F 21/10 380/270 |
| 2008/0247545 A1* | 10/2008 | Teruyama | ............ | H04L 9/0841 380/255 |
| 2008/0307217 A1* | 12/2008 | Yukimatsu | ............ | G06F 21/10 713/150 |
| 2017/0012778 A1* | 1/2017 | Choyi | ................ | H04L 63/0884 |

FOREIGN PATENT DOCUMENTS

| JP | 2008-113172 A | 5/2008 |
|---|---|---|
| JP | 2009-267900 A | 11/2009 |

\* cited by examiner

CONTENT RECEPTION DEVICE 400

FIG. 14

| Source \ Sink | EXISTING ENCRYPTION SCHEME NO PREDETERMINED SECURITY REINFORCEMENT MEASURE | EXISTING ENCRYPTION SCHEME PREDETERMINED SECURITY REINFORCEMENT MEASURE | NEW ENCRYPTION SCHEME |
|---|---|---|---|
| EXISTING ENCRYPTION SCHEME NO PREDETERMINED SECURITY REINFORCEMENT MEASURE | CONTENT OTHER THAN HIGH-VALUE CONTENT CAN BE TRANSMITTED ACCORDING TO EXISTING ENCRYPTION SCHEME (C1401) | CONTENT OTHER THAN HIGH-VALUE CONTENT CAN BE TRANSMITTED ACCORDING TO EXISTING ENCRYPTION SCHEME (C1402) | CONTENT OTHER THAN HIGH-VALUE CONTENT CAN BE TRANSMITTED ACCORDING TO EXISTING ENCRYPTION SCHEME (C1403) |
| EXISTING ENCRYPTION SCHEME PREDETERMINED SECURITY REINFORCEMENT MEASURE | CONTENT OTHER THAN HIGH-VALUE CONTENT CAN BE TRANSMITTED ACCORDING TO EXISTING ENCRYPTION SCHEME (C1411) | HIGH-VALUE CONTENT CAN BE TRANSMITTED ACCORDING TO EXISTING ENCRYPTION SCHEME (C1412) | HIGH-VALUE CONTENT CAN BE TRANSMITTED ACCORDING TO EXISTING ENCRYPTION SCHEME (C1413) |
| NEW ENCRYPTION SCHEME | CONTENT OTHER THAN HIGH-VALUE CONTENT CAN BE TRANSMITTED ACCORDING TO EXISTING ENCRYPTION SCHEME (C1421) | HIGH-VALUE CONTENT CAN BE TRANSMITTED ACCORDING TO EXISTING ENCRYPTION SCHEME (C1422) | HIGH-VALUE CONTENT CAN BE TRANSMITTED ACCORDING TO NEW ENCRYPTION SCHEME (C1423) |

FIG. 15

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Certificate Type ||||| Format |||| Dev Gen |||| Reserved |||||||||| AL || AP || Device ID ||||||||
| Device ID continued (Total 40bits) ||||||||||||||||||||||||||||||||
| Device EC-DSA Public Key (320bits) ||||||||||||||||||||||||||||||||
| DTLA EC-DSA signature of all preceding fields (320 bits for c and followed by d value) ||||||||||||||||||||||||||||||||

CONTENT TRANSMISSION AND RECEPTION DEVICE COMPATIBLE TO SWITCH TO A NEW ENCRYPTION SCHEME

TECHNICAL FIELD

The technology disclosed in the present specification relates to a content transmission device and a content transmission method, a content reception device and a content reception method, a computer program, and a content transmission system encrypting and transmitting, for example, content of which a right such as a copyright is protected using a key shared according to a predetermined mutual authentication and key exchange algorithm such as DTCP.

BACKGROUND ART

In recent years, with advances in data compression technologies, propagation of high-speed networks, and the like, high-value content with high quality (for example, content with a 4 k resolution) has been distributed as digital data through various media. Further, for example, information devices such as personal computers have high performance, and thus it is easy for illegal devices to use content illegally. For this reason, there is more of a demand than ever to reinforce protection of content which is digital data. High-value content makers and suppliers are assumed not to permit digital transmission when security is not reinforced.

In order to reinforce security of content protection systems, changing encryption schemes to be used is considered.

For example, key generation devices that vary the lengths of keys to be used in accordance with requested service security levels by generating a plurality of public keys corresponding to a plurality of secret keys from single secret keys of users and storing the public keys in certificates (for example, see Patent Literature 1).

SUMMARY OF INVENTION

Technical Problem

It is desirable to provide a content transmission device and a content transmission method, a content reception device and a content reception method, a computer program, and a content transmission system which are excellent and capable of appropriately encrypting and transmitting content of which a right such as a copyright is protected.

It is also desirable to provide a content transmission device and a content transmission method, a content reception device and a content reception method, a computer program, and a content transmission system which are excellent and capable of performing transition to safer systems with smaller loads.

Solution to Problem

The present disclosure has been made in view of the above problems. A technology according to claim 1 is a content transmission device including: an authentication and key-sharing unit configured to perform mutual authentication and transferring of a shared key with a content reception device according to a predetermined transmission standard; and a content supply unit configured to encrypt and transmit content using an encryption key generated from the shared key to the content reception device. The authentication and key-sharing unit switches the shared key to be transferred according to whether the content reception device has a predetermined security strength.

According to a technology according to claim 2 of the present disclosure, in the content transmission device according to claim 1, the authentication and key-sharing unit transfers a first shared key capable of handling first content to a content reception device which has the predetermined security strength and transfers a second shared key not capable of handling the first content to a content reception device which does not have the predetermined security strength, and the content supply unit encrypts and transmits the first content with an encryption key generated from the first shared key and refrains from encrypting and transmitting the first content with an encryption key generated from the second shared key.

According to a technology according to claim 3 of the present disclosure, in the content transmission device according to claim 2, the predetermined security reinforcement measure ensures security of a weaker portion other than an encryption scheme.

According to a technology according to claim 4 of the present disclosure, in the content transmission device according to claim 2, the first and second shared keys are shared keys for generating an encryption key according to a first encryption scheme, and the authentication and key-sharing unit transfers the first or second shared key to a content reception device which supports only the first encryption scheme and transfers a shared key for generating an encryption key according to a second encryption scheme to a content reception device which supports the second encryption scheme.

According to a technology according to claim 5 of the present disclosure, in the content transmission device according to claim 2, the authentication and key-sharing unit determines whether the content reception device is a device that has the predetermined security strength based on an ES flag stored in a device certificate sent from the content reception device at the time of the mutual authentication.

According to a technology according to claim 6 of the present disclosure, in the content transmission device according to claim 2, the authentication and key-sharing unit determines whether the content reception device is a device that has the predetermined security strength based on an ES flag stored in a CAPABILITY field of a payload of a command sent from the content reception device at the time of the mutual authentication.

According to a technology according to claim 7 of the present disclosure, in the content transmission device according to claim 6, the authentication and key-sharing unit determines whether the content reception device supports the second encryption scheme based on an NS flag stored in a CAPABILITY field of a payload of a command sent from the content reception device at the time of the mutual authentication.

According to a technology according to claim 8 of the present disclosure, in the content transmission device according to claim 6 or 7, an electronic signature calculated from data of the CAPABILITY field using a secret key of the content reception device accompanies the CAPABILITY field.

According to a technology according to claim 9 of the present disclosure, in the content transmission device according to claim 7, the authentication and key-sharing unit assumes that an error has occurred and interrupts the mutual authentication process when the authentication and key-sharing unit confirms that the ES flag is stored in a device certificate sent from the content reception device and is not able to confirm the NS flag in a command at the time of the mutual authentication.

According to a technology according to claim 10 of the present disclosure, in the content transmission device according to claim 2, the authentication and key-sharing unit stores an NS flag indicating support or non-support of a second encryption scheme in a CAPABILITY field of a payload of a command to be sent to the content reception device at the time of the mutual authentication and causes an electronic signature calculated from data of the CAPABILITY field using a secret key of the content transmission device to accompany the CAPABILITY field.

According to a technology according to claim 11 of the present disclosure, in the content transmission device according to claim 3, the predetermined transmission standard is Digital Transmission Content Protection (DTCP) or DTCP-IP (DTCP mapping to IP).

A technology according to claim 12 of the present disclosure is a content transmission method including: an authentication and key-sharing step of performing mutual authentication and transferring of a shared key with a content reception device according to a predetermined transmission standard: and a content supply step of encrypting and transmitting content using an encryption key generated from the shared key to the content reception device. In the authentication and key-sharing step, the shared key to be transferred is switched according to whether the content reception device has a predetermined security strength.

A technology according to claim 13 of the present disclosure is a content reception device including: an authentication and key-sharing unit configured to perform mutual authentication and reception of a shared key with a content transmission device according to a predetermined transmission standard; and a content acquisition unit configured to acquire content encrypted and transmitted using an encryption key generated from the received shared key. The authentication and key-sharing unit receives a first shared key capable of handling first content according to that the content reception device has a predetermined security strength. The content acquisition unit acquires the first content encrypted and transmitted with an encryption key generated from the first shared key.

According to a technology according to claim 14 of the present disclosure, in the content reception device according to claim 13, the authentication and key-sharing unit stores an ES flag indicating whether the content reception device has the predetermined security strength in a device certificate to be sent to the content transmission device at the time of the mutual authentication.

According to a technology according to claim 15 of the present disclosure, in the content reception device according to claim 13, the authentication and key-sharing unit stores at least one of an ES flag indicating whether the content reception device has the predetermined security strength and an NS flag indicating whether the content reception device supports an encryption scheme in a CAPABILITY field of a payload of a command to be sent to the content transmission device at the time of the mutual authentication.

According to a technology according to claim 16 of the present disclosure, in the content transmission device according to claim 15, the authentication and key-sharing unit causes an electronic signature calculated from data of the CAPABILITY field using a secret key of the content transmission device to accompany the CAPABILITY field.

A technology according to claim 17 of the present disclosure is a content reception method including: an authentication and key-sharing step of performing mutual authentication and reception of a shared key with a content transmission device according to a predetermined transmission standard; and a content acquisition step of acquiring content encrypted and transmitted using an encryption key generated from the received shared key. In the authentication and key-sharing step, a shared key according to that a content reception device has a predetermined security strength is received.

A technology according to claim 18 of the present disclosure is a computer program described in a computer-readable format to cause a computer to function as: an authentication and key-sharing unit configured to perform mutual authentication and transferring of a shared key with a content reception device according to a predetermined transmission standard; and a content supply unit configured to encrypt and transmit content using an encryption key generated from the shared key to the content reception device. The authentication and key-sharing unit switches the shared key to be transferred according to whether the content reception device has a predetermined security strength.

A technology according to claim 19 of the present disclosure is a computer program described in a computer-readable format to cause a computer to function as: an authentication and key-sharing unit configured to perform mutual authentication and reception of a shared key with a content transmission device according to a predetermined transmission standard; and a content acquisition unit configured to acquire content encrypted and transmitted using an encryption key generated from the received shared key. The authentication and key-sharing unit receives a shared key according to that the computer has a predetermined security strength.

A computer program according to claim 13 of the present disclosure defines a computer program that is written in a computer-readable format so as to achieve predetermined processing on a computer. In other words, by installing the computer program according to the embodiment on a computer, a cooperative effect is exerted on the computer and, accordingly, an effect similar to that obtained in the content transmission device according to claim 1 of the present disclosure can be obtained.

A technology according to the present disclosure is a content transmission system including: a content transmission device and a content reception device configured to perform mutual authentication and exchange of a shared key and encrypt and transmit content using an encryption key generated from the shared key. The content transmission device switches a shared key to be transferred according to whether the content reception device has a predetermined security strength.

Here, the expression "system" refers to a logical grouping of a plurality of apparatuses (and/or functional modules that realize specified functions), and does not depend on such apparatuses and/or functional modules being present inside a single housing.

Advantageous Effects of Invention

According to the technology disclosed in the present specification, it is possible to provide the content transmission device and the content transmission method, the content reception device and the content reception method, the computer program, and the content transmission system which are excellent and capable of performing transition to safer systems with smaller loads.

The content transmission system to which the technology disclosed in the present specification is applied can reduce a load on a device until complete transition by performing transition to a safer system in which an encryption scheme is newly set step by step.

In addition, the effects described in the present specification are merely illustrative and demonstrative, and not limitative. In other words, the technology according to the present disclosure can exhibit other effects that are evident to those skilled in the art along with or instead of the effects based on the present specification.

The object, features, and advantages of the present disclosure will be made clear later by a more detailed explanation that is based on the embodiments of the present disclosure and the appended drawings.

BRIEF DESCRIPTION OF DRAWINGS

FIG. 14 is a diagram illustrating a correspondence relation of encryption schemes and transmittable content between the source and sink devices.

FIG. 15 is a diagram illustrating the format of a device certificate.

DESCRIPTION OF EMBODIMENTS

Figure 1:
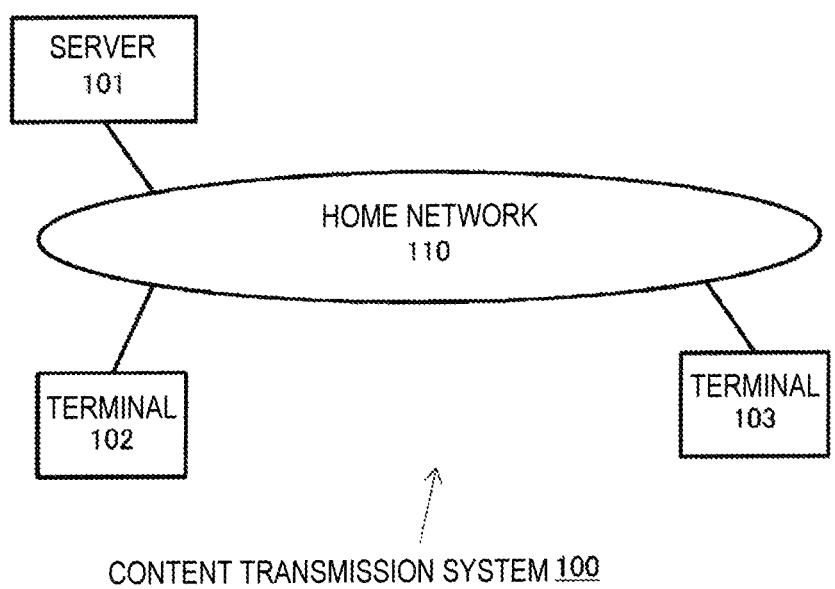
FIG. 1 is a diagram illustrating an example of the configuration of a content transmission system 100 to which the technology disclosed in the present specification is applied.

To reinforce security, there is a request for desiring to newly set an encryption scheme to be used, for example, when high-value content is transmitted. For example, a request for lengthening a key length of elliptic curve cryptography (ECC) can be exemplified.

However, when a device handling content supports a new scheme of an encryption algorithm, various problems occur. For example, it takes much time and cost to mount hardware or software performing a process of a new scheme and verify an operation of the hardware or the software.

When a key length is changed as a new encryption scheme, there is a high possibility that it will be necessary to modify a system, for example, by embedding a new key in an existing device. Further, when an encryption scheme is changed to a more secure encryption scheme, a higher processing capability is generally necessary. Therefore, the load on the device also occurs. Though security is reinforced so that only a part of a device supports a new encryption scheme, the security may not be ensured as a whole when another part is weak. That is, respective units have to have the same level of security strength.

When a system is switched to a new encryption algorithm, loss of compatibility with an existing system is also considered.

In contrast, in the technology disclosed in the present specification, a load is designed to be reduced by performing transition to a safer system step by step. Specifically, by allowing a device of a transition step which implements a predetermined security reinforcement measure to handle high-value content only for a given system transition period, a problem of a time necessary for the transition can be avoided and the transition to the safer system can be performed smoothly. The device mentioned herein which implements the predetermined security reinforcement measure is, for example, a device which supports only an existing encryption algorithm and for which security of a weaker portion other than the encryption scheme is ensured.

The technology disclosed in the present specification can be applied to, for example, content transmission in which Digital Transmission Content Protection (DTCP) which is a standard technology of the industry for digital content transmission protection is applied.

Here, in DTCP, an authentication protocol between devices at the time of content transmission and a transmission protocol for encrypted content are agreed upon. DTCP contains, for example, regulations that a device conforming to DTCP not send compressed content that is easy to handle to the outside of the device in an unencrypted state, key exchange necessary for decoding encrypted content be performed according to a predetermined mutual authentication and key exchange (AKE) algorithm, and a range of devices performing the key exchange be restricted according to an AKE command. Originally, DTCP regulated content transmission on a home network using a transmission path such as IEEE1394 or the like. In recent years, development of DTCP+ that contains a remote access function using DTCP-IP (DTCP mapping to IP) in which the DTCP technology is transplanted to an IP network is also in progress.

Hereinafter, embodiments in which the technology disclosed in the present specification is applied mainly to a content transmission system adopting DTCP and DTCP-IP will be described in detail with reference to the drawings. The DTCP specification is assumed to obey DTCP Specification Volume 1 Revision 1.7 and the DTCP-IP specification is assumed to obey DTCP-IP Volume 1 Supplement E Revision 1.4.

A. System Configuration

FIG. 1 schematically illustrates an example of the configuration of a content transmission system 100 to which the technology disclosed in the present specification is applied. The content transmission system 100 illustrated in the drawing is configured to include a server 101, a terminal 102, and a terminal 103 connected to a home network 110 installed in a home. In the drawing, only one server and two terminals are drawn for simplicity, but two or more servers and three or more terminals are also assumed to be installed in a home network.

The server 101 is a device that supplies content to the terminals 102 and 103. The server 101 is, for example, a set-top box, a recorder, a television receiver, a personal computer, or a network access server (NAS). For example, the server 101 supplies the terminals 102 and 103 with broadcast content received or recorded in terrestrial digital broadcast, commercial content such as a movie read from a recording medium (not illustrated) such as a Blu-ray disc, or content downloaded from a content server (not illustrated) on the Internet. The terminals 102 and 103 are devices that request the server 101 to transmit content over the home network 110 and correspond to multi-functional portable terminals such as mobile phones, smartphones, or tablets. The terminal 102 accumulates content downloaded from the server 101 and further supplies the content to the terminal 103 in some cases. Examples of content supply forms include streaming or movement (Move) of content.

In the embodiment, different types of devices such as the server 101 and the terminal 102 are mutually connected via the home network 110 according to a protocol regulated in, for example, Digital Living Network Alliance (DLNA). A communication order at the time of mutual connection between the server 101 and the terminal 102 is assumed to obey, for example, Universal Plug and Play (UPnP) and, for example, a process such as device discovery is performed. In the embodiment, when compressed content is transmitted between the mutually connected server 101 and terminal 102 or 103, an encryption process obeying, for example, DTCP is used so that illegal use is not allowed. That is, the terminal 102 desiring to use content requests to download the content accumulated in the server 101 after the terminal 102 shares a shared key (described below) along with mutual authentication with the server 101 according to a predetermined mutual authentication and key exchange (AKE) algorithm. The server 101 encrypts and transmits the requested content using an encryption key generated from a shared key. The server 101 supplying the content corresponds to a source device of DTCP and the terminal 102 using the content corresponds to a sink device of DTCP. Even when content is downloaded from the terminal 102 to the terminal 103, similarly, the content is encrypted and transmitted after mutual authentication and a shared key is shared according to an AKE algorithm. In this case, the terminal 102 serves as a source device of DTCP and the terminal 103 serves as a sink device of DTCP. When the terminals 102 and 103 desire to access (remotely access) the server 101 from the outside of the home network 110, such as an outside destination, it is necessary to register the terminals 102 and 103 in advance in the server 101 in the home network 110 (described below).

Figure 2:
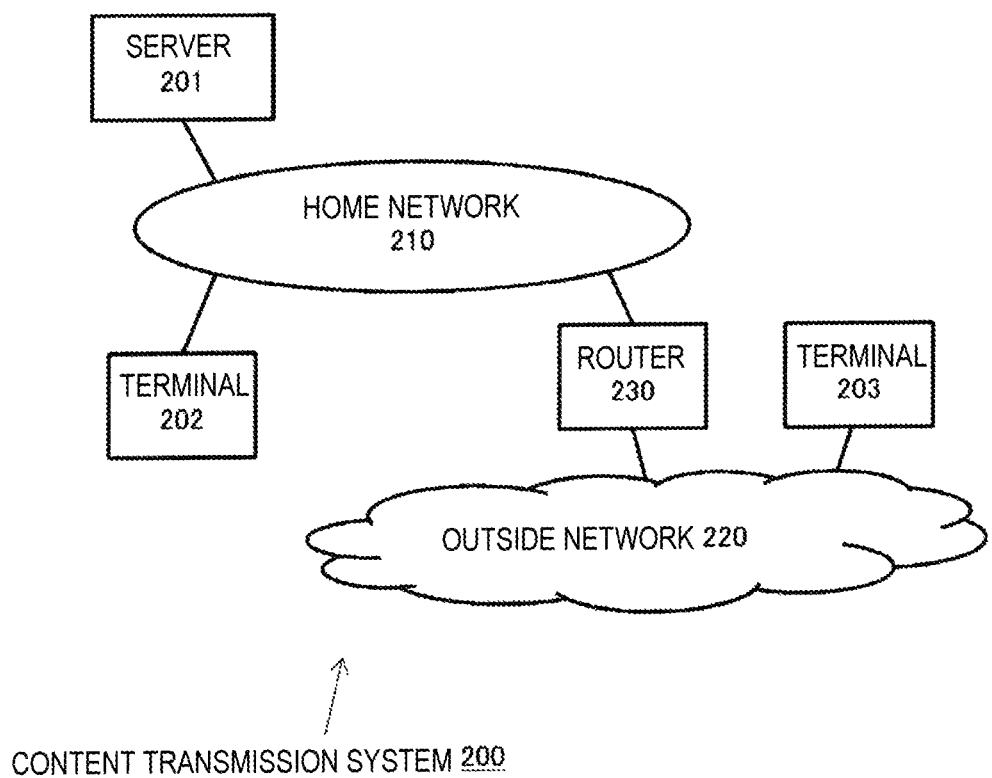
FIG. 2 is a diagram schematically illustrating another example of the configuration of a content transmission system 200 to which the technology disclosed in the present specification is applied.

FIG. 2 schematically illustrates another example of the configuration of a content transmission system 200 to which the technology disclosed in the present specification is applied. The content transmission system 200 illustrated in the drawing is configured to include a server 201 and a terminal 202 connected to a home network 210 installed in a home and a terminal 203 connected to an outside network 220 such as the Internet. The home network 210 and the outside network 220 are mutually connected via a router 230 according to the Internet Protocol (IP) protocol. In the drawing, only one server and one terminal are drawn on the home network 210 for simplicity, but it is also assumed that two or more servers are installed or a terminal is connected to the home network 210 and two or more terminals are further connected to the outside network 220.

The server 201 is, for example, a set-top box, a recorder, a television receiver, a personal computer, or a network access server (NAS). The server 201 supplies broadcast content or commercial content, or the like to the terminal 202 performing remote access from the outside network 220. Examples of content supply forms include streaming or movement (Move) of content. The terminal 202 is a multi-functional portable terminal such as a mobile phone, a smartphone, or a tablet and requests the server 201 to transmit content over the IP network formed from the home network 210 and the outside network 220.

In the embodiment, different types of devices such as the server 201 and the terminals 202 and 203 are mutually connected via the home network 210 and the outside network 220 according to a protocol regulated in, for example, DLNA. In a communication order at the time of mutual connection between the server 201 and the terminal 202, for example, a process such as device discovery is performed according to, for example, UPnP. In the embodiment, when compressed content is transmitted between the server 201 and the terminal 202 and between the terminals 202 and 203 mutually connected via the home network 210 and the outside network 220, an encryption process obeying, for example, DTCP-IP is used so that illegal use is not allowed. That is, the terminal 203 performs mutual authentication with the server 201 or the terminal 202 over the IP network formed from the home network 210 and the outside network 220 and shares a shared key (described below) for the remote access, and subsequently requests the server 201 or the terminal 202 to transmit the content accumulated in the server 201 or the terminal 202. The server 201 or the terminal 202 encrypts and transmits the content requested from the terminal 203 using the encryption key generated from the shared key for the remote access. It is necessary to register the terminal 203 in advance in the server 201 or the terminal 202 in the home network 210 (described below). The server 201 or the terminal 202 supplying the content corresponds to a source device of DTCP and the terminal 203 using the content corresponds to a sink device of DTCP.

Figure 3:
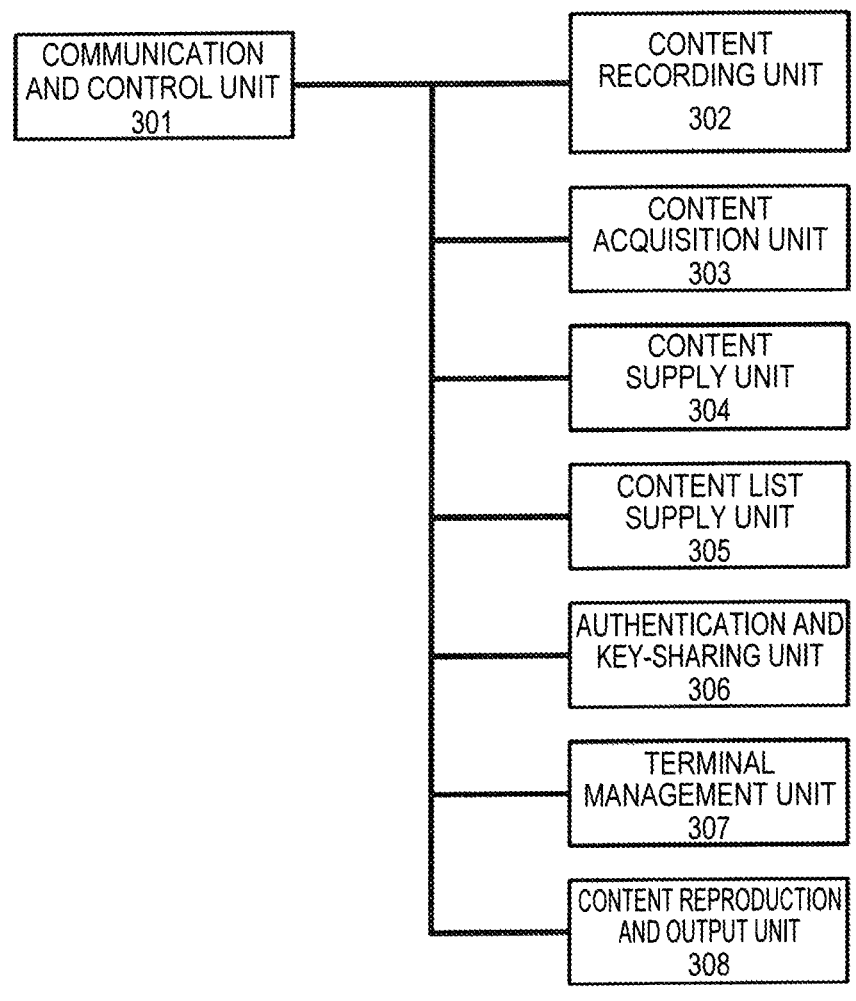
FIG. 3 is a diagram schematically illustrating a functional configuration of a content transmission device 300 operating as a source device.

FIG. 3 schematically illustrates a functional configuration of a content transmission device 300 operating as a source device of DTCP. For example, the server 101 downloading content to the terminal 102 or the terminal 102 downloading content to the terminal 103 in the content transmission system 100 illustrated in FIG. 1 or the server 201 downloading content to the terminals 102 and 103 or the terminal 102 downloading content to the terminal 103 in the content transmission system illustrated in FIG. 2 correspond to the source device illustrated in the drawing.

A communication and control unit 301 controls a communication operation via a home network or an outside network and generally controls an operation of entire content transmission device 300. In the embodiment, the communication and control unit 301 performs mutual connection with different types of devices such as terminals via a home network and an outside network according to a protocol regulated in DLNA. A communication order at the time of mutual connection is assumed to obey, for example, UPnP and the communication and control unit 301 performs, for example, a process such as device discovery on the device. The communication and control unit 301 includes an interface for outside device connection (or content digital output) such as High Definition Multimedia Interface (HDMI: registered trademark), Mobile High-Definition Link (MHL: registered trademark), or Universal Serial Bus (USB), and thus a recording and reproduction device such as a hard disk device or a Blu-ray disc device can be externally attached and connected.

A content recording unit 302 records the content to be supplied to a terminal over the home network and the outside network. The content recording unit 302 includes, for example, a recording medium recording content, such as a hard disk, a Blu-ray disc, or a Digital Versatile Disc (DVD), and manages all content recorded under management of, for example, a general file system such as File Allocation Table (FAT).

A content acquisition unit 303 acquires the content to be supplied to a terminal. The content acquisition unit 303 is configured by, for example, a terrestrial broadcast tuner and acquires broadcast content. In this case, the content acquisition unit 303 is based on a specification regulated in, for example, Association of Radio Industries and Businesses (ARIB). The content acquisition unit 303 has, for example, a function of receiving all of the segments or some of the segments of broadcast channels, an electronic program guide (EPG) function (program searching, program information display, or program reservation), a copy control function based on a High-bandwidth Digital Content Protection (HDCP) specification or the like, and a content protection function of restrictively receiving broadcast content or encrypting the received broadcast content when the content is output to the outside.

The content acquisition unit 303 reads commercial content such as a movie from a media reproduction device (not illustrated) such as a Blu-ray disc connected to the communication and control unit 301 from a medium. The content acquisition unit 303 is configured by a browser or the like and downloads paid or free content from a content server (not illustrated) on the Internet.

The content acquisition unit 303 may record the acquired content in the content recording unit 302, as necessary. The content acquisition unit 303 also acquires content supplied to the sink device from the content recording unit 302.

The content (broadcast content or commercial content acquired by the content acquisition unit 303) also includes high-value content formed from digital data with high quality. Suppliers or the like of the high-value content may request that the content be handled at a higher security level.

A content supply unit 304 responds to a request from a content reception device (described below) operating as a sink device and supplies the content acquired by the content acquisition unit 303. The content supply unit 304 transmits the content to the sink device via the communication and control unit 301 using, for example, a hypet text transfer protocol (HTTP) protocol or a real time protocol (RTP). The content supply unit 304 is assumed to have a compression function or include a content compression processing unit which is not illustrated in FIG. 3. In the embodiment, to ensure security of content to be transmitted, that is, prevent the content from being used illegally, the DTCP standard is applied. That is, the content supply unit 304 performs content encryption and transmission on the compressed content using an encryption key generated from a shared key shared with the sink device by an authentication and key-sharing unit 306 (described below). Here, when a sink device requests the content transmission device to transmit content by the remote access from an outside network, the sink device has to be registered in advance in a terminal management unit 307 (described below).

A content list supply unit 305 responds to the request from the content reception device (described below) operating as the sink device and supplies a list and detailed information of content which can be supplied. As understood from the foregoing description, examples of the content which can be supplied to the terminals by the servers 101 and 201 include broadcast content received by the content acquisition unit 303, commercial content read from media, and content already recorded on the content recording unit 302. For example, a content directory service (CDS) function which is formulated with Universal Plug and Play (UPnP) which is a basis of DLNA and is a function of layering and delivering the list of the content and the detailed information of the content is applied to the supply of the list of the content. For example, CDS information is generated in response to a CDS: Browse action from a sink device and is returned as a CDS result.

The authentication and key-sharing unit 306 performs authentication regulated by DTCP-IP and the mutual authentication according to the key exchange (AKE) algorithm with the sink device which is a content request source and also performs transferring of a shared key $K_X$ for generating a content encryption key $K_c$. The authentication and key-sharing unit 306 shares a shared key $K_R$ for the remote access with the sink device requesting to transmit content by the remote access from an outside network and shares a shared key $K_{XM}$ for movement (Move) with the sink device requesting to move content.

As described above, the content (broadcast content or commercial content) also includes high-value content formed from digital data with high quality. High-value content suppliers or the like request that the content be handled at a higher security level in some cases. In the embodiment, the authentication and key-sharing unit 306 differentiates a shared key $K_{X2}$ handed to an existing sink device which does not implement the security reinforcement measure from a shared key $K_{X1}$ handed to a sink device which implements the predetermined security reinforcement measure. Since the latter shared key $K_{X1}$ is shared with only a device which implements the predetermined security reinforcement measure, high-value content can be handled using the shared key $K_{X1}$ (since an existing device has only the shared key $K_{X2}$, and thus may not decode high-value content encrypted based on the shared key $K_{X1}$). Additionally, the authentication and key-sharing unit 306 may transfer a shared key $K_{X\_NEW}$ for generating an encryption key with a long key length instead of the shared key $K_x$ for generating an encryption key with an existing key length to a sink device supporting a new encryption scheme (with a lengthened key length) (that is, performing complete transition). However, the details of a process of transferring a shared key will be described below.

Here, the device which implements the predetermined security reinforcement measure is, for example, a device which supports only an existing encryption algorithm and in which security of a weaker portion other than the encryption scheme is ensured, and is placed as a device of the transition step when a system is substituted with a new encryption scheme. An existing encryption scheme is applied between devices of the transition step without change. However, by setting the dedicated shared key $K_{X1}$, high-value content can be handled. Further, a process of separately using a shared key for handling high-value content can be performed similarly using dedicated shared keys $K_{R1}$ and $K_{XM1}$ even at the time of the foregoing remote access and content movement (Move).

The terminal management unit 307 manages information regarding the sink device requesting to transmit content. In the current DTCP-IP specification, in order to restrict use of content by a third party, the remote access to a server in a home is restricted to only a sink device registered in the server. Only the sink device registered in advance in the terminal management unit 307 is assumed to be permitted to request to transmit content by the remote access. The terminal management unit 307 performs a process of performing prior registration on a sink device using content by the remote access from an outside network and manages information regarding the sink device as "remote sink registry" or "remote access connection (RAC) registry." Here, since the prior registration is not directly related to the technology disclosed in the present specification, the detailed description thereof will be omitted.

A content reproduction and output unit 308 decodes the content recorded in the content recording unit 302 to reproduce and output the content.

The foregoing functional blocks 303 to 307 can also be realized as an application program that is executed above an operating system or the TCP/IP protocol in the communication and control unit 301. Such a type of application program can be delivered with a predetermined download site on a wide area network such as the Internet to be downloaded and supplied to a consumer electronics (CE) device such as a digital broadcast tuner or a TV receiver or a multi-functional terminal such as a smartphone for use.

Figure 22:
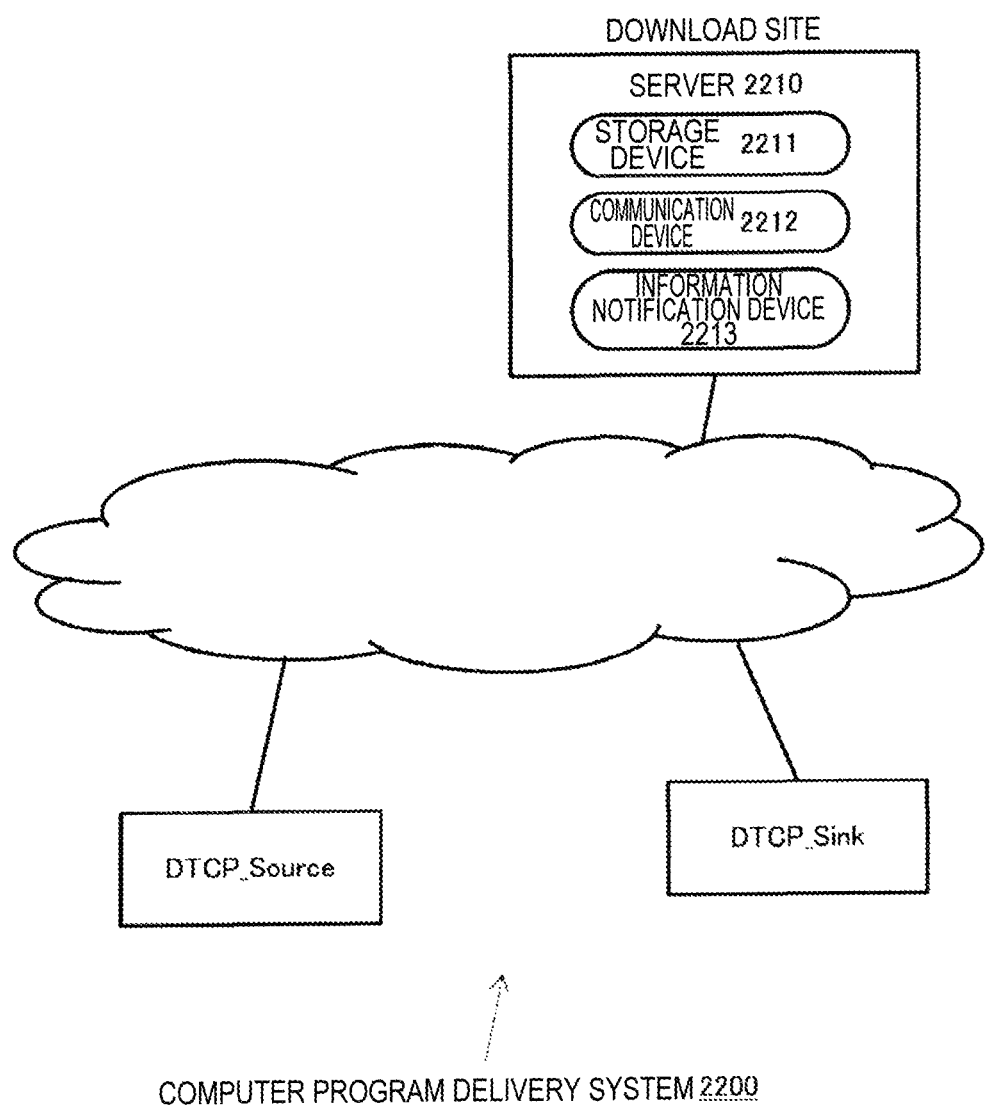
FIG. 22 is a diagram illustrating the configuration of a computer program delivery system 2200.

For example, such a download site is configured by a server 2210 that includes a storage device 2211 storing a computer program and a communication device 2212 permitting download in response to reception of a request for downloading the computer program (see FIG. 22). The download site forms a computer program delivery system 2200 along with a client device (a source device of DTCP or a sink device of DTCP) installing the downloaded computer program. Such a type of server further includes an information notification device 2213 that notifies a client of information indicating the name of a computer program in response to a request for downloading a computer program from the client. For example, the information notification device 2213 notifies the client of information indicating an application supplying commercial content recorded at home to a terminal in a remote location along with the name of the computer program.

Figure 4:
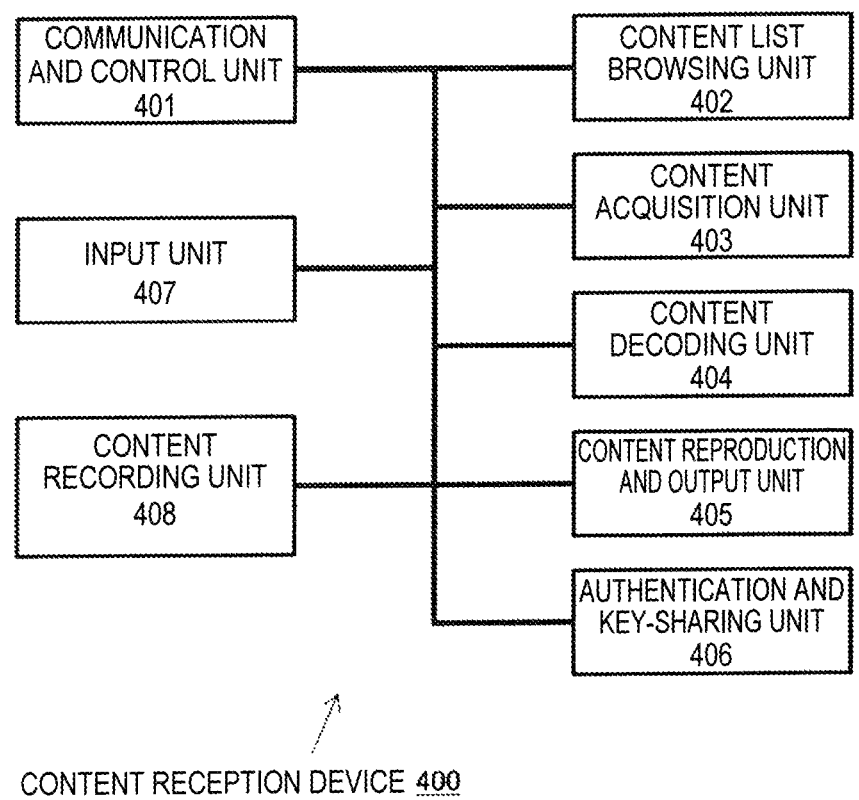
FIG. 4 is a diagram schematically illustrating a functional configuration of a content reception device 400 operating as a sink device.

FIG. 4 is a diagram schematically illustrating a functional configuration of a content reception device 400 operating as a sink device of DTCP. For example, the terminal 102 requesting the server 101 to transmit content or the terminal 103 requesting the server 101 or the terminal 102 to transmit content in the content transmission system 100 illustrated in FIG. 1 or the terminal 202 requesting the server 201 to transmit content or the terminal 203 requesting the server 201 or the terminal 202 to transmit the content in the content transmission system 200 illustrated in FIG. 2 correspond to sink devices.

A communication and control unit 401 controls a communication operation via a home network or an outside network and generally controls an operation of the entire content reception device 400. In the embodiment, the communication and control unit 401 performs mutual connection with different types of devices such as terminals via a home network and an outside network according to a protocol regulated in DLNA. A communication order at the time of mutual connection is assumed to obey, for example, UPnP and the communication and control unit 401 performs, for example, a responding process for device discovery from a control point.

A content list browsing unit 402 performs a request for acquiring a list of the content to the content transmission device 300 (described above) operating as a source device and displays a browsing screen for the acquired list of the content. For example, the CDS function which is formulated with UPnP which is a basis of DLNA is applied (as described above) to the browsing of the list of the content. For example, a CDS: Browse action is issued to the source device. When the CDS information describing the list of the content which can be supplied by the source device is received as, for example, a CDS result, the content list browsing unit 402 displays a content list screen. A user can select content desired to be reproduced and output on the content list screen through an input unit 407 or the like. The input unit 407 corresponds to, for example, a keyboard and a mouse in a personal computer, a touch panel in a multi-functional terminal such as a smartphone, or a cross key and a decision button in a remote controller.

A content acquisition unit 403 transmits a request for acquiring content to the source device and acquires the content in the source device. For example, the content acquisition unit 403 requests to acquire the content selected by the user, as described above, in the content list screen displayed by the content list browsing unit 402. The content acquisition unit 403 uses a protocol such as HTTP or RTP to request to acquire the content from the source device and acquire the content (as described above).

The content acquired by the content acquisition unit 403 from the source device is encrypted using an encryption key generated from a shared key shared with the source device by the authentication and key-sharing unit 406 to be described below (described below). A content decoding unit 404 can decode the encrypted content acquired from the source device using the encryption key generated from the shared key. Then, a content reproduction and output unit 405 reproduces and outputs the decoded content.

A content recording unit 408 records the content acquired in a download (copy or movement) format by the content acquisition unit 403. The recorded content is also subjected to a separate encryption process for recording. The content recording unit 302 includes, for example, a recording medium that records content, such as a hard disk, a Blu-ray, or a DVD and manages all content recorded under management of, for example, a general file system such as FAT.

The authentication and key-sharing unit 406 performs authentication regulated by DTCP-IP and mutual authentication according to the key exchange (AKE) algorithm with a source device which is a content request destination and also receives the shared key $K_X$ for generating the content encryption key $K_C$. The authentication and key-sharing unit 406 shares the shared key $K_R$ for the remote access with the source device requesting the content by the remote access from an outside network. When movement of the content is requested, the authentication and key-sharing unit 406 further shares the shared key $K_{XM}$ for the movement (Move) with the source device. The authentication and key-sharing unit 406 is assumed to perform prior registration for the remote access in the source device at the time of connection of the home network 210 (described below).

As described above, the content (broadcast content or commercial content) also includes high-value content formed from digital data with high quality. High-value content suppliers or the like request that the content be handled at a higher security level in some cases. In the embodiment, the authentication and key-sharing unit 406 notifies the source device of whether the security reinforcement measure is implemented in the content reception device 400 when the shared key is received. When the security reinforcement measure is not implemented, the authentication and key-sharing unit 406 receives the shared key $K_{X2}$. When the security reinforcement measure is implemented, the authentication and key-sharing unit 406 receives the shared key shared key $K_{X1}$. Since the latter shared key $K_{X1}$ is shared with only the device of the transition step which implements the predetermined security reinforcement measure, high-value content can be received from the source device to be decoded using the shared key $K_{X1}$ (as described above). Additionally, the content reception device 400 is a sink device supporting a new encryption scheme (with a lengthened key length) (that is, performing complete transition), a shared key $K_{X\_NEW}$ for generating an encryption key with a long key length is also received instead of the shared key for generating an encryption key with an existing key length. However, the details of a process of transferring a shared key will be described below.

The foregoing functional blocks 402 to 406 can also be realized as an application program that is executed above an operating system or the TCP/IP protocol in the communication and control unit 401. Such a type of application program can be delivered with a predetermined download site on a wide area network such as the Internet to be downloaded and supplied to a multi-functional terminal such as a smartphone reproducing the content in a home server for use.

For example, such a download site is configured by a server 2210 that includes a storage device 2211 storing a computer program and a communication device 2212 permitting download in response to reception of a request for downloading the computer program (see FIG. 22). The download site forms a computer program delivery system 2200 along with a client device (a source device of DTCP or a sink device of DTCP) installing the downloaded computer program. Such a type of server further includes an information notification device 2213 that notifies a client of information indicating the name of a computer program in response to a request for downloading a computer program from the client. For example, the information notification device 2213 notifies the client of information indicating an application being permitted to allow browsing of commercial content recorded at home in a remote location along with the name of the computer program.

B. Communication Operation in System

Next, a communication operation performed between a source device and a sink device according to the DTCP specification and the DTCP-IP specification will be described.

The source device mentioned herein is the server 101 downloading content to the terminals 102 and 103 or the terminal 102 downloading content to the terminal 103 in the content transmission system 100 illustrated in FIG. 1 or is the server 201 downloading content to the terminals 202 and 203 or the terminal 202 downloading content to the terminal 203 in the content transmission system illustrated in FIG. 2. The sink device is the terminal 102 requesting the server 101 to transmit content or the terminal 103 requesting the server 101 or the terminal 102 to transmit content in the content transmission system 100 illustrated in FIG. 1 or is the terminal 202 requesting the server 201 to transmit the content or the terminal 203 requesting the server 201 or the terminal 202 to transmit content in the content transmission system 200 illustrated in FIG. 2.

Figure 5:
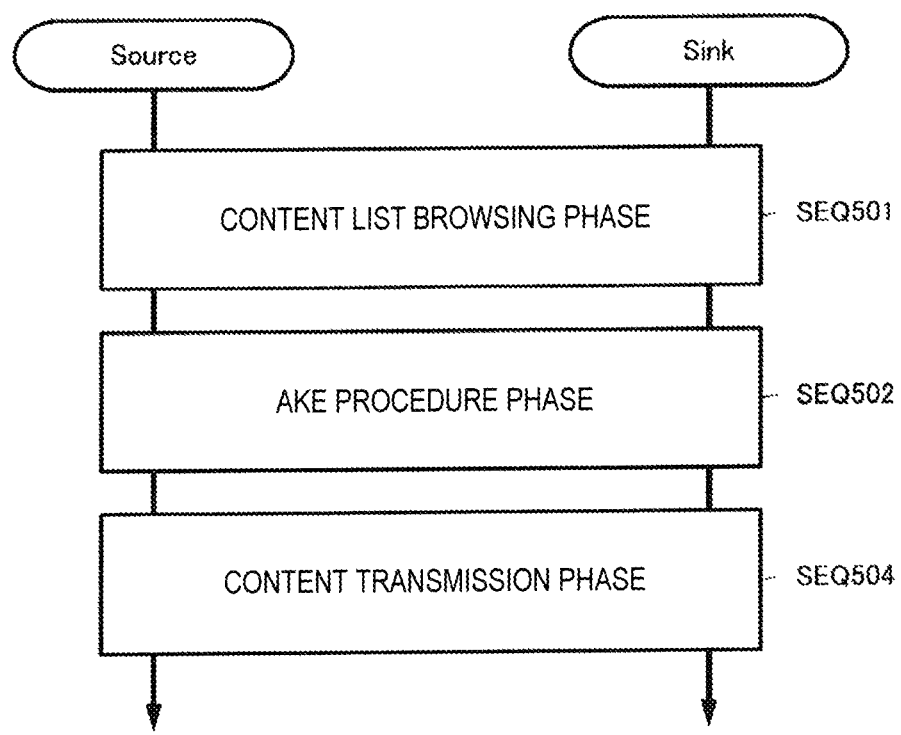
FIG. 5 is a diagram schematically illustrating an overall order when content is transmitted between the source device and the sink device.

FIG. 5 is a diagram schematically illustrating an overall order when content is transmitted between the source device and the sink device. A content movement order illustrated in the drawing includes a content list browsing phase (SEQ 501) of designating content which the sink device requests to move, an AKE procedure phase (SEQ 502) of performing mutual authentication and a key exchange order between the source device and the sink device to share the shared key $K_X$, and a content transmission phase (SEQ 503) of encrypting and transmitting the content designated in the content list browsing phase using the encryption key $K_C$ generated from the shared key $K_X$.

Figure 6:
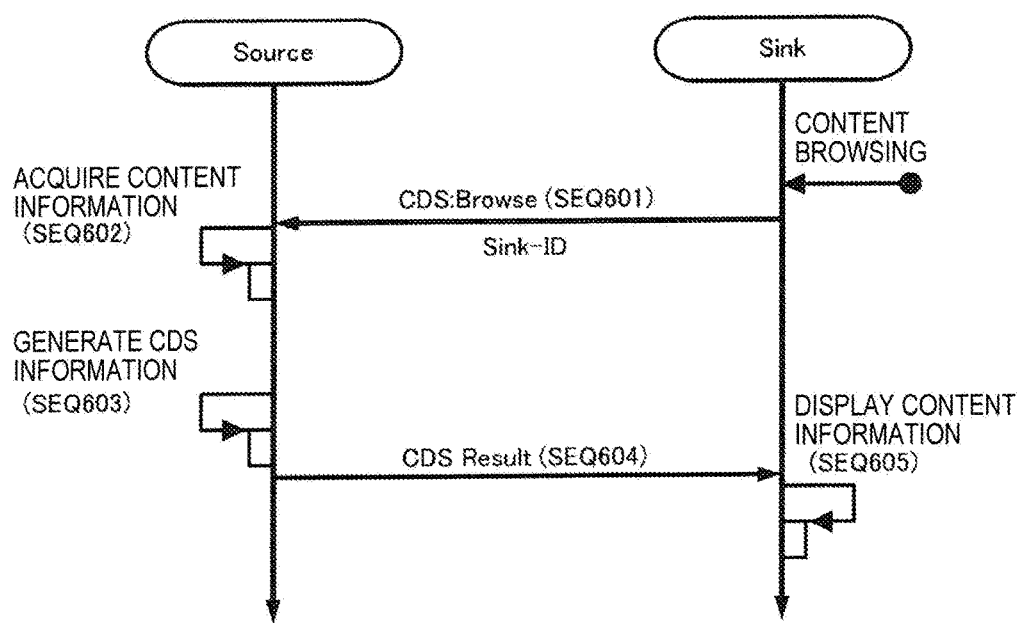
FIG. 6 is a diagram schematically illustrating the details of a content list browsing phase (SEQ 501).

FIG. 6 is a diagram schematically illustrating the details of the content list browsing phase (SEQ 501). This processing order is performed mainly between the content list supply unit 305 on the source device side and the content list browsing unit 402 on the sink device side.

A request for browsing the list of the content is issued from the content list browsing unit 402 of the sink device (SEQ 601). The CDS function which is formulated with UPnP which is a basis of DLNA and is a function of layering and delivering the list of the content and the detailed information of the content is applied to the browsing of the list of the content (as described above). Accordingly, in SEQ 601, the CDS: Browse action is issued from the sink device.

On the source device side, the content list supply unit 305 acquires all content information which can be acquired regarding the content suppliable by the content supply unit 304 in response to the CDS: Browse action (SEQ 602) and generates CDS information with a sufficient information amount (SEQ 603). Then, the source device returns the CDS information as a CDS result to the sink device (SEQ 604).

On the sink device side, the content list browsing unit 402 analyzes the received CDS result and displays titles of the content and content information including more detailed information (SEQ 605). Then, the user of the sink device can select content desired to be reproduced from the list of the displayed content. When the content is selected, transmission of the content from the source device to the sink device starts. Before the transmission of the content, the mutual authentication and the key exchange, that is, the AKE process (SEQ 502), are performed between the sink device and the source device.

In the DTCP specification, there are two types of decided schemes, full authentication in which a public key encryption scheme is used as an AKE processing scheme and restricted authentication in which a secret key scheme is used as the AKE processing scheme. In the restricted authentication, only two types of content, No More Copy and Copy one generation, can be handled. In the full authentication, however, content of Copy Never can also be handled in addition to the foregoing two types of data.

Figure 7:
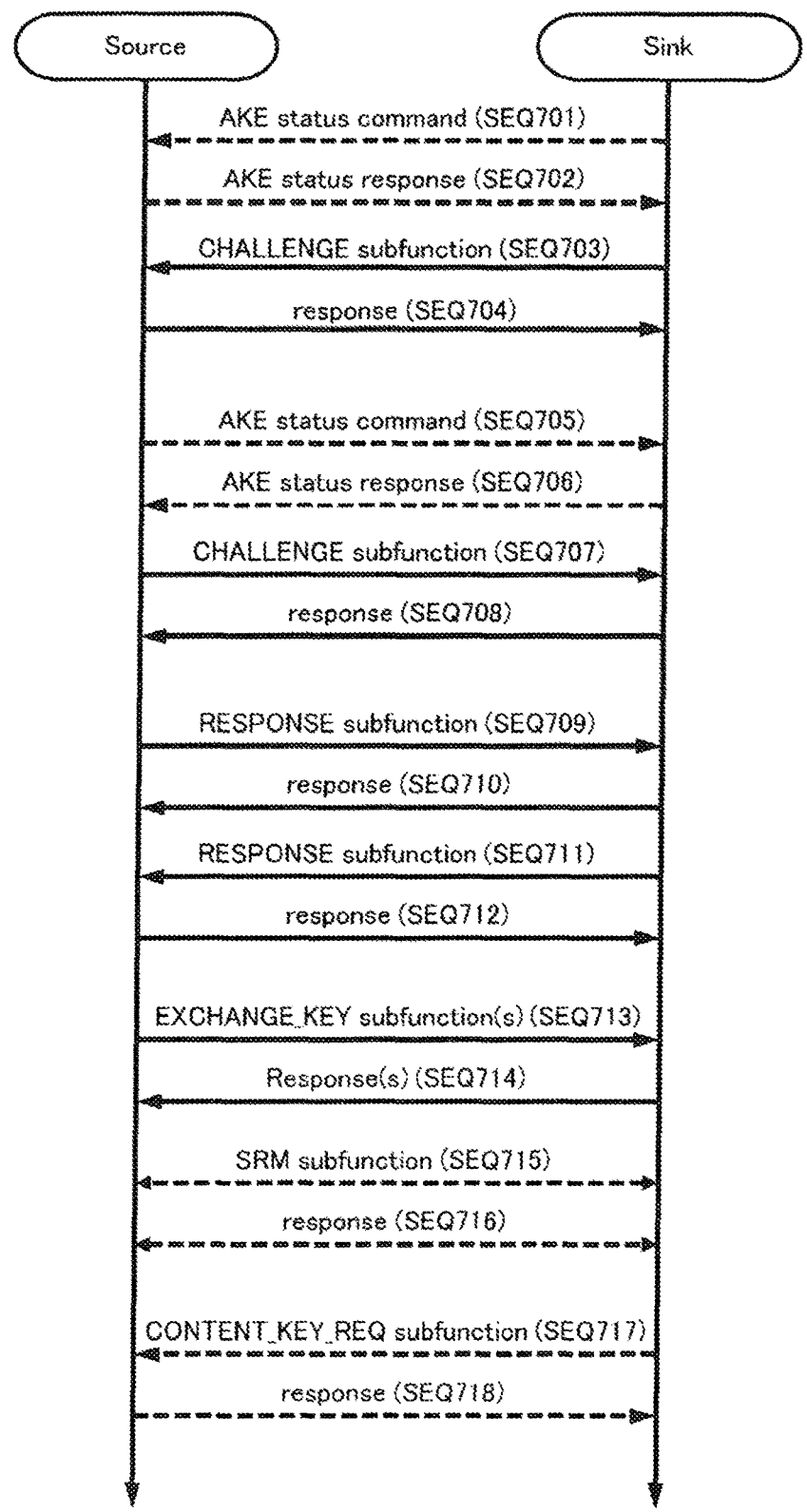
FIG. 7 is a diagram illustrating the details of an AKE procedure phase (SEQ 502) by full authentication.

FIG. 7 illustrates the details of the AKE procedure phase (SEQ 502) by the full authentication regulated in the DTCP specification. Here, arrows depicted with solid lines are performed under normal circumstances and arrows depicted with dotted lines are performed conditionally. This processing order is performed mainly between the authentication and key-sharing unit 306 of the source device side and the authentication and key-sharing unit 406 of the sink device side.

First, the sink device transmits an AKE status command (SEQ 701) to attempt to confirm a status of the source device, for example, to confirm whether the source device supports the full authentication. In response, the source device gives an AKE status response (SEQ 702).

Subsequently, the sink device transmits a random number to the source device by a CHALLENGE subfunction message (SEQ 703) to initialize an AKE 2.5 process of the source device. The CHALLENGE subfunction message includes a device certificate. The device certificate is a certificate which is supplied from a DTLA to each device conforming to DTCP. The format of the device certificate is illustrated in FIG. 15. The source device verifies consistency of the device certificate of the sink device and sends a response (SEQ 704).

The source device transmits an AKE status command (SEQ 705) and attempts to confirm a status of the sink device, and the sink device gives an AKE status response (SEQ 706). Then, the source device transmits a random number to the sink device by a CHALLENGE subfunction message (SEQ 707) to initialize the AKE process of the sink device. In response, the source device sends an AKE status response (SEQ 708).

Subsequently, the source device calculates the previously transmitted random number by a calculation formula embedded in the partner device and transmits the result to the sink device by a RESPONSE subfunction message (SEQ 709). In response, the sink device returns to a response (SEQ 710). Similarly, the sink device calculates the previously transmitted random number by a calculation formula embedded in the partner device and transmits the result to the source device by a RESPONSE subfunction message (SEQ 711). In response, the source device returns a response (SEQ 712). The sink device and the source device can compare the received value with the result calculated based on the calculation formula embedded in the own device and mutually recognize that the partner is the device having the same protocol when the value is identical to the result.

Subsequently, the source device generates the shared key $K_X$ used to generate an encryption key of the content and transmits the shared key $K_X$ to the sink device in an EXCHANGE_KEY subfunction message (SEQ 713). In response, the sink device returns a response (SEQ 714).

Subsequently, transmission of a system renewability message (SRM) subfunction message and sending of a response are exchanged between the sink device and the source device (SEQ 715 and SEQ 716). It is confirmed whether systems of both sides have newer versions (SEQ 715).

Subsequently, the sink device transmits a CONTENT_KEY_REQ subfunction message to the source device and requests the source device to transmit an encryption key (SEQ 717). In response, the source device sends the encryption key in a response (SEQ 718).

Figure 8:
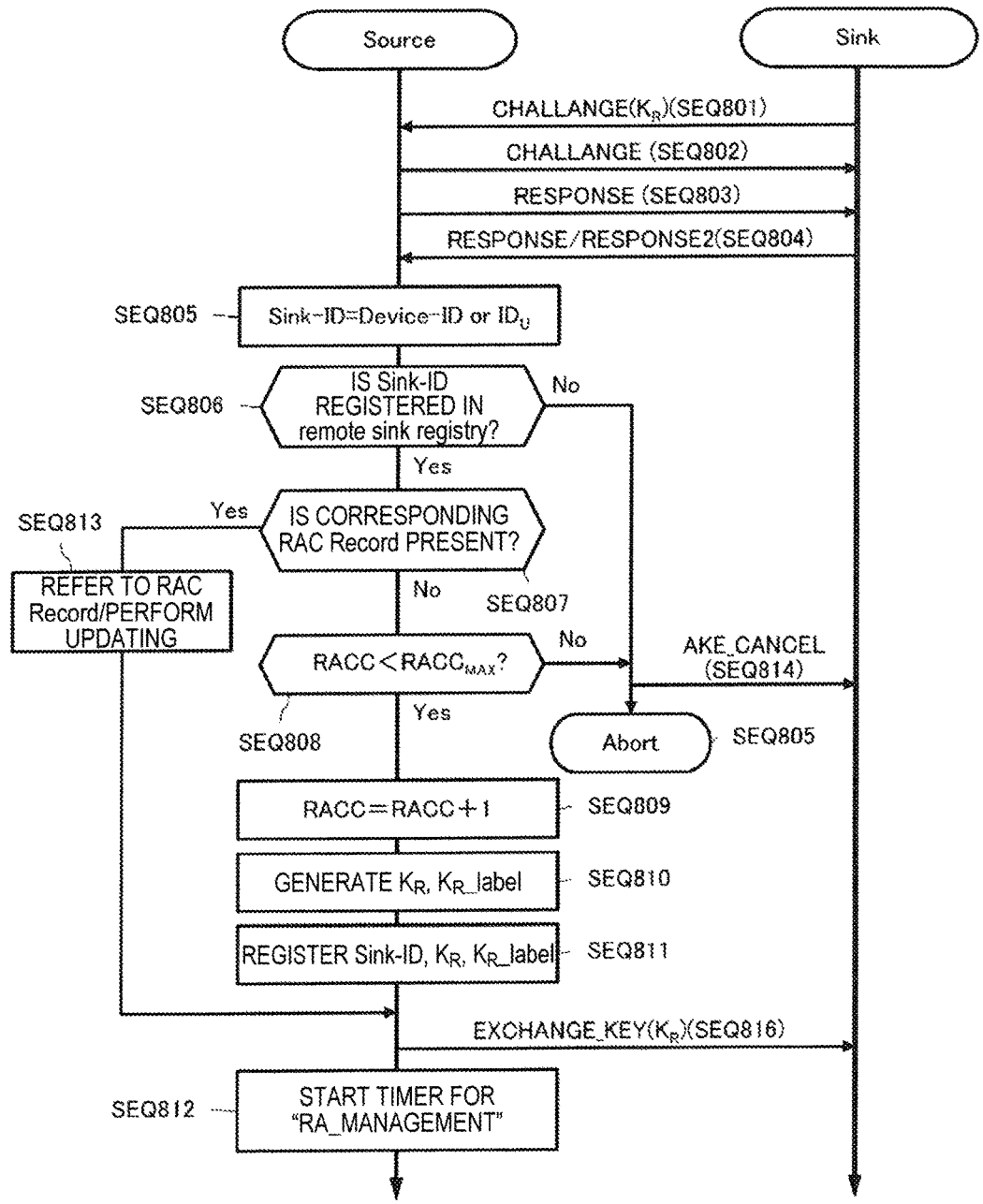
FIG. 8 is a diagram illustrating the details of an AKE (RA-AKE) procedure phase (SEQ 502) performed at the time of remote access.

FIG. 8 illustrates the details of the AKE (RA-AKE) procedure phase (SEQ 502) performed at the time of the remote access and regulated in the DTCP-IP specification. In the DTCP-IP specification, in order to restrict use of content by a third party, the remote access is restricted to the sink device registered in advance in the source device (as described above). The AKE process illustrated in the drawing includes a procedure of checking whether the sink device is registered in advance. This processing order is performed mainly between the authentication and key-sharing unit 306 of the source device side and the authentication and key-sharing unit 406 of the sink device side.

The sink device transmits a CHALLENGE command including a shared key field in which bits for the shared key $K_R$ (Remote Exchange Key) for the remote access are set and requests the source device to perform the AKE process (SEQ 801). Then, a challenge and response portion in the authentication order is performed between the source device and the sink device (SEQ 802 to SEQ 804). Here, when the bits for the shared key $K_R$ of the CHALLENGE command are not set, the source device can stop an RA-AKE procedure and continuously perform the AKE procedure other than RA-AKE.

When the source device receives a device ID or IDu as the sink-ID from the sink device (SEQ 805), the source device checks whether a sink-ID is registered in the remote sink registry (described above) managed in the terminal management unit 307 of the source device (SEQ 806).

When the sink-ID is not listed in the remote sink registry (No in SEQ 806), the source device transmits an AKE_CANCEL command to the sink device (SEQ 814) and stops the RA-AKE procedure (SEQ 815).

Conversely, when the sink-ID is already registered in the remote sink registry (Yes in SEQ 806), the source device checks the inside of an RAC registry (described below) to determine whether an RAC record corresponding to the sink-ID is already present (SEQ 807).

When the RAC record corresponding to the sink-ID is present (Yes in SEQ 807), the source device decides to use the shared key $K_R$ for the remote access and a shared key label $K_R$_label stored in the RAC record. Alternatively, when the source device does not transmit the content using the shared key KR for the remote access, the source device may update the values of the stored $K_R$ and $K_R$_label with reference to the inside of the RAC record (SEQ 813).

When the sink-ID is registered in the remote sink registry and the corresponding RAC record is not present (No in SEQ 807), the source device checks whether a count value RACC for counting the RAC record is less than $RACC_{max}$ (SEQ 808). Here, $RACC_{max}$ is a counter that counts remote access connection and is initialized to zero when there is no remote access connection.

When RACC is not less than $RACC_{max}$ (No in SEQ 808), the source device transmits the AKE_CANCEL command to the sink device (SEQ 814) and stops the RA-AKE procedure (SEQ 815).

When RACC is less than $RACC_{max}$ (Yes in SEQ 808), the source device increases the value of RACC by 1 (SEQ 809), subsequently generates the shared key $K_R$ for the remote access and the shared key label $K_R$_label according to a predetermined calculation rule (SEQ 810), and stores the shared key $K_R$ and the shared key label $K_R$_label in the RAC record in the RAC registry in association with the sink-ID of the sink device (SEQ 811). The source device manages, for example, the RAC record in the terminal management unit 307.

Then, the source device transmits the shared key KR for the remote access and the shared key label $K_R$_label extracted from the existing RAC record (the case of updating is included) or the newly generated shared key KR for the remote access and shared key label $K_R$_label to the sink device (SEQ 816).

When the source device supports an RA_MANAGEMENT function, a $K_R$ survival timer for retaining the shared key $K_R$ for the remote access starts and $K_R$ is retained for at least 1 minute (SEQ 812).

Figure 9:
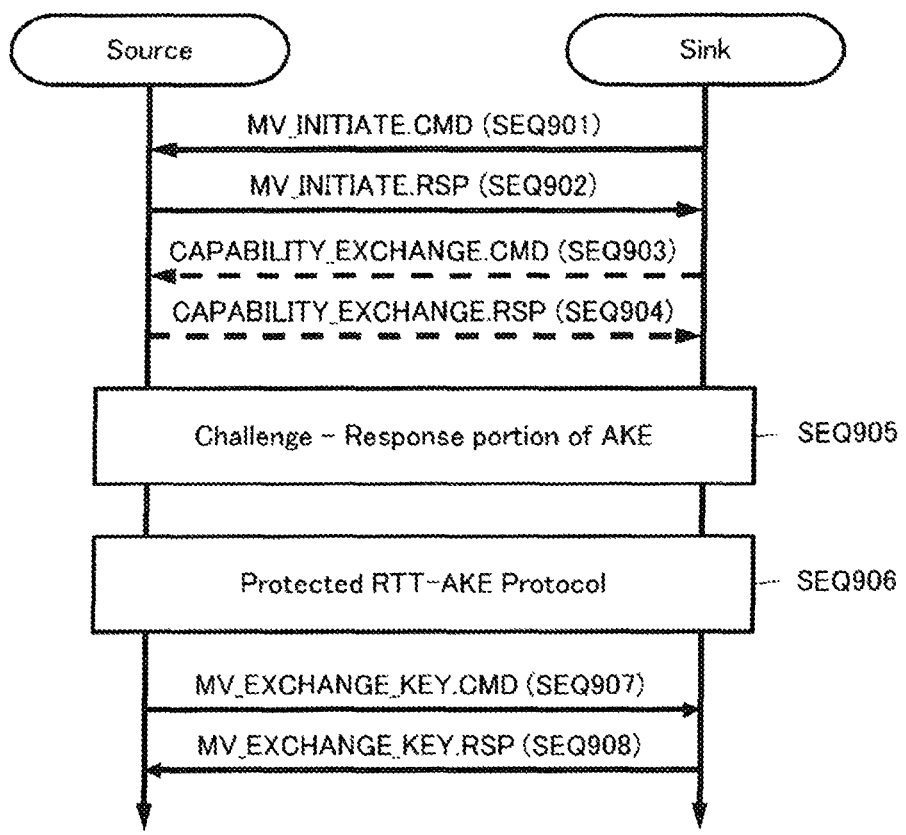
FIG. 9 is a diagram illustrating the details of an AKE (MOVE RTT-AKE) procedure phase (SEQ 502) performed to move (MOVE) content by the remote access.

FIG. 9 illustrates the details of the AKE (Move RTT-AKE) procedure phase (SEQ 502) performed to move the content by the remote access and regulated in the DTCP-IP specification. This processing order is performed mainly between the authentication and key-sharing unit 306 of the source device side and the authentication and key-sharing unit 406 of the sink device side.

The sink device starts the AKE (MOVE RTT-AKE) procedure for movement by transmitting an MV_INITIATE command to the source device (SEQ 901). In response, the source device sends an MV_INITIATE response as a reception confirmation when the source device can perform a Move protocol of DTCP-IP (SEQ 902).

The sink device transmits a CAPABILITY_EXCHANGE command to the source device at a time point at which it is necessary to exchange capability information (SEQ 903). In response, the source device sends a CAPABILITY_EXCHANGE response (SEQ 904).

Subsequently, the sink device and the source device perform a Challenge-Response portion of the AKE procedure (SEQ 905). The Challenge-Response portion of the AKE procedure includes a sequence (not illustrated) from transmission of a CHALLENGE command from the sink device and transmission of a response from the sink device to the transmission of RESPONSE or RESPONSE2 from the source device. The source device and the sink device share an authentication key ($HK_{AUTH}$) for movement through the Challenge-Response portion of the AKE procedure.

Subsequently, a Protected RTT protocol procedure is performed (SEQ 906). In the DTCP-IP specification, in order to restrict the remote access, restriction is imposed on a round-trip delay time (RTT: Round Trip Time) of an AKE command. The Protected RTT protocol procedure is a procedure of confirming the restriction on the RTT (described below). Here, for example, when the sink device is already present in an RTT registry or the device ID of the sink device is already present in the RAC registry (described above) for the remote access, the Protected RTT Protocol procedure can be skipped.

Thereafter, the source device generates the shared key $K_{XM}$ for the movement from the authentication key ($HK_{AUTH}$) for the movement described above and transmits the shared key $K_{XM}$ to the sink device using an MV_EXCHANGE_KEY command (SEQ 907). In response, the sink device sends an MV_EXCHANGE_KEY response (SEQ 908).

Figure 10:
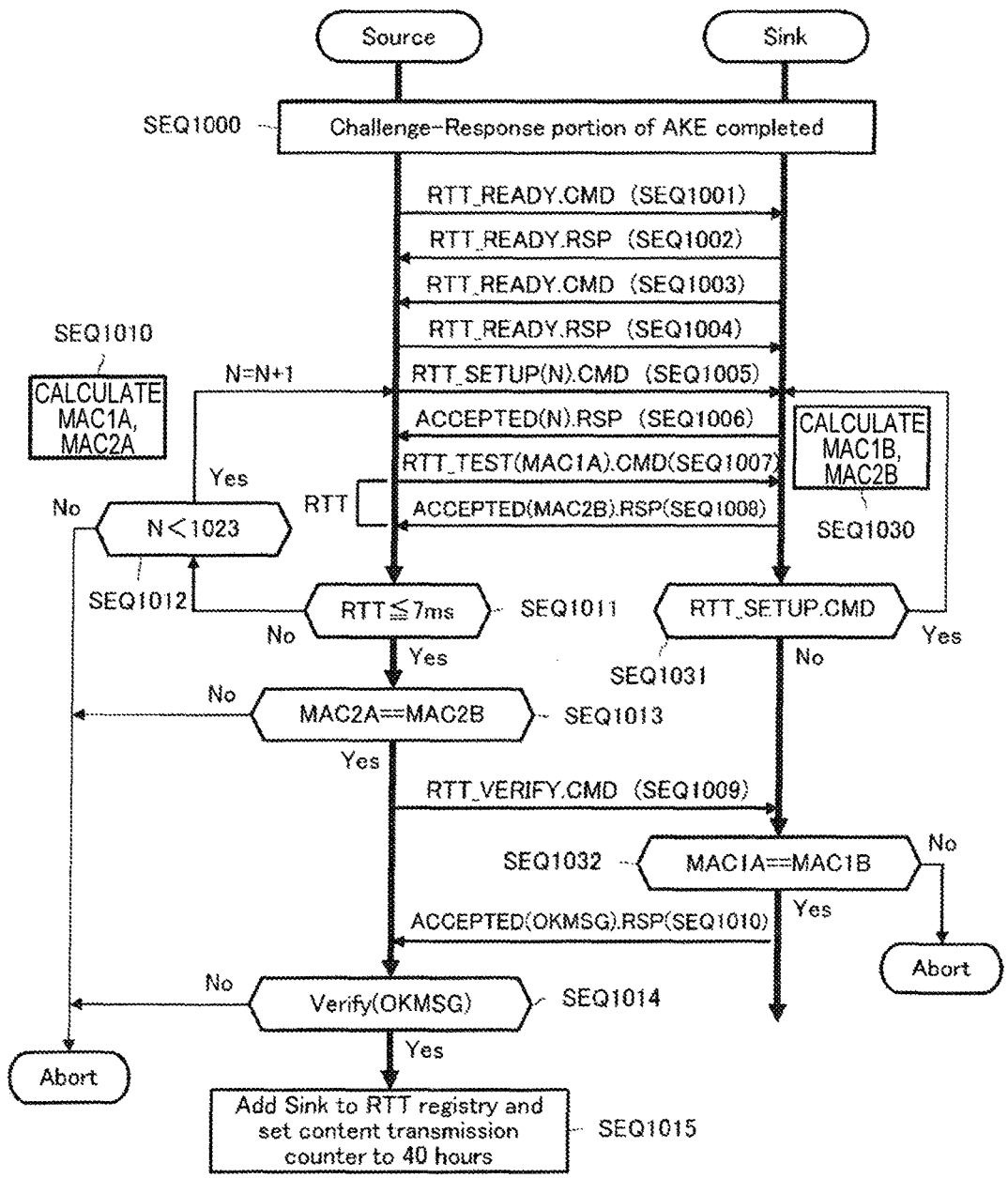
FIG. 10 is a diagram illustrating the details of a Protected RTT Protocol procedure (SEQ 906).

FIG. 10 illustrates the details of the Protected RTT Protocol procedure (SEQ 906).

In a Challenge-Response portion of AKE (SEQ 1000), an Rx challenge including an Rx random number and an Rx certificate (device certificate) is transmitted from the sink device. In response, the source device responds with a Tx challenge including a Tx random number and a Tx certificate (device certificate). Thereafter, an Rx response including an Rx random number, a Tx message, and a Tx certificate is transmitted from the source device and a Tx response including a Tx random number, an Rx message, and an Rx certificate is transmitted from the sink device, so that a normal challenge and response authentication order continues (not illustrated).

After the Challenge-Response portion of AKE (SEQ 1000) is completed, a command RTT_READY.CMD is transmitted from the source device (SEQ 1001) and a response RTT_READY.RSP is sent from the sink device (SEQ 1002). Then, when a command RTT_READY.CMD is transmitted from the sink device (SEQ 1003) and a response RTT_READY.RSP is sent from the source device (SEQ 1004), the Protected RTT Protocol procedure starts. At this time, the source device side calculates two types of message authentication codes (Message Authentication Code) MAC1A and MAC2A (SEQ 1010) and the sink device side also calculates two types of message authentication codes MAC1B and MAC2B by the same calculation method (SEQ 1030). The source device transmits a variable N in a command RTT_SETUP(N).CMD (SEQ 1005). In response, the sink device sends a response and ACCEPTED(N).RSP (SEQ 1006). Both of the source and sink devices prepare a message authentication code in regard to the variable N transmitted herein.

Then, the source device transmits RTT_TEST(MAC1A).CMD which is a command for RTT measurement (SEQ 1007) and the sink device sends ACCEPTED(MAC2B).RSP which is a response to the command (SEQ 1008).

The source device determines whether the round-trip delay time RTT from transmission of a command for RTT measurement to reception of a response is equal to or less than a regulated threshold value (7 milliseconds), that is, performs RTT checking (SEQ 1011). When the RTT exceeds the threshold value (No in SEQ 1011), the source device further checks whether the number of trials exceeds 1023 times (SEQ 1012). When the number of trials does not exceed 1023 times (Yes in SEQ 1012), the source device increases N by only 1, then prepares a message authentication code corresponding to new N, and transmits an RTT_SETUP(N) command (SEQ 1005), and the sink device also prepares a message authentication code corresponding to the new N and transmits an ACCEPTED(N) response. In this way, transmission and the command for the RTT measurement and the sending of the response are repeated between the source device and the sink device. When the number of trials exceeds 1023 times (No in SEQ 1012), the source device stops (aborts) this authentication order.

Conversely, when the RTT is equal to or less than the threshold value (Yes in SEQ 1011), the source device further checks whether the message authentication code MAC2B received with ACCEPTED(MAC2B).RSP is identical to MAC2A generated by the source device (SEQ 1013). When the message authentication code MAC2B is not identical to MAC2A (No in SEQ 1013), the source device stops (aborts) this authentication order.

When the message authentication code MAC2A is mutually identical to MAC2B (Yes in SEQ 1013), the source device transmits an RTT verification command RTT_VERIFY.CMD (SEQ 1009). The sink device responds to this command (No in SEQ 1031) and checks whether the message authentication code MAC1A received with RTT_TEST(MAC1A).CMD is identical to MAC1B generated by the sink device (SEQ 1032). When the message authentication code MAC1A is not identical to MAC1B (No in SEQ 1032), the sink device stops (aborts) this authentication order.

When the message authentication code MAC1A is identical to MAC1B (Yes in SEQ 1032), the sink device responds with ACCEPTED(OKMSG).RSP (SEQ 1010).

When the source device receives ACCEPTED(OKMSG). RSP from the sink device, the source device verifies a message OKMSG included in ACCEPTED(OKMSG).RSP (SEQ 1014). When the source device succeeds in the verification of the message OKMSG (Yes in SEQ 1014), the source device adds the sink device to the RTT registry and sets the content transmission counter to 40 hours (SEQ 1015). When the source device fails in the verification of the message OKMSG (No in SEQ 1014), the source device stops (aborts) this authentication order.

When the mutual authentication is successful in any AKE process in FIGS. 7 to 9, the same shared key $K_X$ can be shared between the source device and the sink device. Here, the shared key at the time of the remote access is denoted by $K_R$ and the shared key at the time of movement of the content by the remote access is denoted by $K_{XM}$. Hereinafter, these shared keys will simply be denoted together as $K_X$ for convenience.

Figure 11:
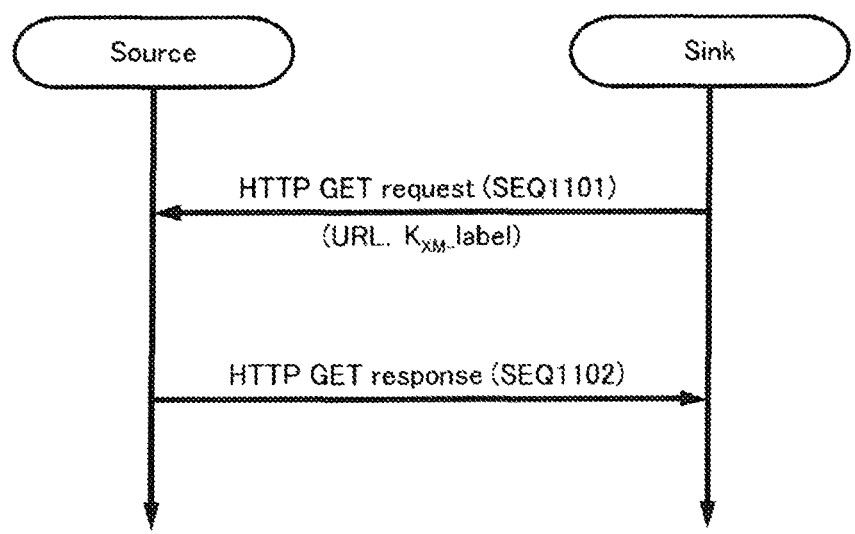
FIG. 11 is a diagram schematically illustrating the details of a content transmission phase (SEQ 503).

In the content transmission phase (SEQ 503), the content is encrypted and transmitted using the shared key $K_X$ obtained in the foregoing manner. FIG. 11 schematically illustrates the details of the content transmission phase (SEQ 503). This processing order is performed mainly between the content supply unit 304 of the source device side and the content acquisition unit 403 of the sink device side.

The sink device requests the source device to transmit the content in an HTTP request (HTTP GET request) using an HTTP GET method (SEQ 1101). The HTTP GET request includes not only a Uniform Resource Locator (URL) of the content but also the shared key label $K_X$_label acquired in the AKE procedure phase (SEQ 502).

When the source device permits the request for the content from the sink device and generates the encryption key $K_C$ from the shared key $K_X$ designated with the shared key label $K_X$_label, the source device encrypts the content using the encryption key $K_C$ and transmits the content to the sink device as an HTTP response (HTTP GET response) (SEQ 1102).

Figure 12:
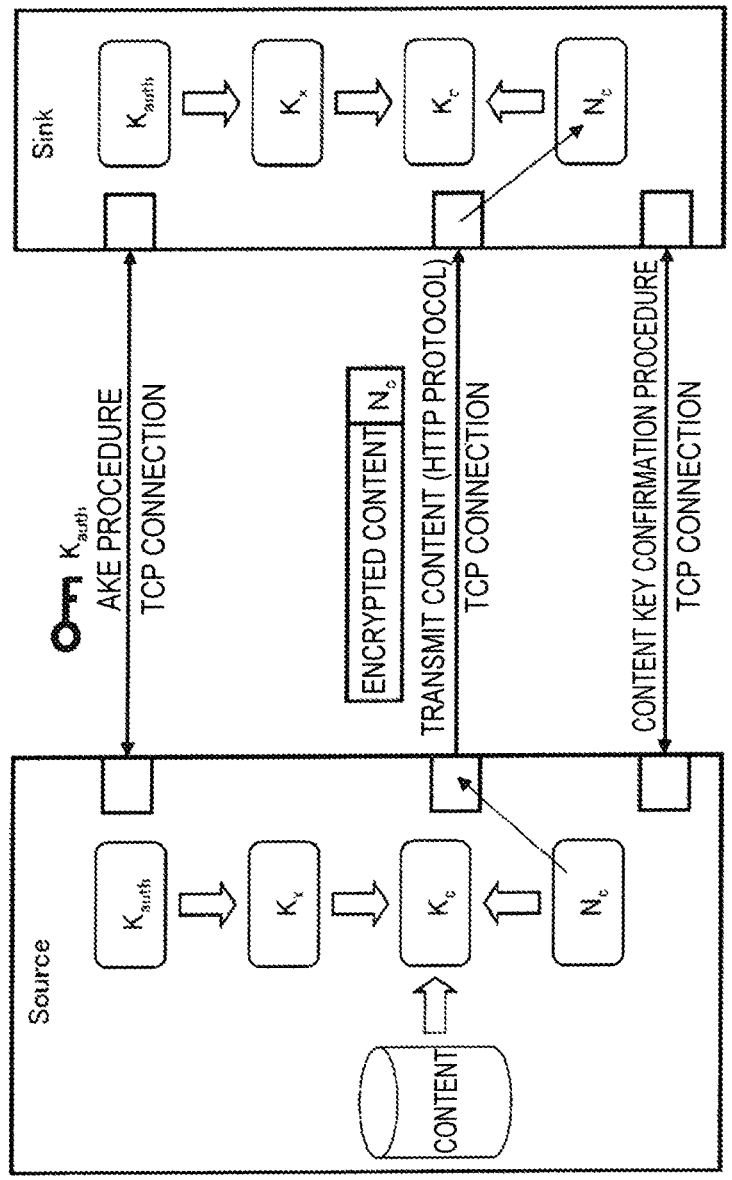
FIG. 12 is a diagram schematically illustrating the flow of encryption, transmission, and decoding of content based on a DTCP specification and a DTCP-IP specification.

A flow of the encryption, transmission, and decoding of the content based on the DTCP specification and the DTCP-IP specification is schematically illustrated in FIG. 12.

The source device and the sink device first establish one TCP/IP connection and perform the AKE procedure. Then, after the devices mutually confirm that the devices are devices conforming to the legitimate DTCP based on the mutual device certificates, the devices share an authentication key $K_{auth}$. Then, when the source device generates a shared key $K_X$, the source device encrypts the shared key $K_X$ using the authentication key $K_{auth}$ and transmits the shared key $K_X$ to the sink device.

After the AKE procedure ends, the content is transmitted using a protocol such as the HTTP (see FIG. 11). At this time, apart from the TCP/IP connection for the AKE procedure, TCP/IP connection for transmission of the content is generated.

The source device encrypts the content to be transmitted. Specifically, the source device generates a nonce $N_c$ using a random number, sets the shared key $K_x$ and the nonce $N_c$, and generates the encryption key $K_c$ through a calculation process corresponding to an encryption mode (described below). Then, the content is encrypted using the encryption key $K_c$.

The HTTP response for transmitting the encrypted content from the source device is formed from one or more PCPs. Specifically, when the source device generates the nonce $N_c$ using the random number, the source device calculates the encryption key $K_c$ based on the shared key $K_X$, the nonce $N_c$, and an extended encryption mode indicator (E-EMI) indicating the encryption mode and encrypts the content using the encryption key $K_c$ (where the E-EMI is configured by a field with a 4-bit length describing the encryption mode and the value thereof corresponds to 7 types of copy control information). The nonce Nc and the E-EMI are included in the header, and a protected content packet (PCP) packet including the encrypted content in a payload is loaded on a TCP stream. According to an IP protocol, the TCP stream including the encrypted content is split with sizes of packets which are predetermined units, and IP packets are formed by further adding header portions, and the IP packets are delivered to a designated IP address.

When the sink device receives the IP packets from the source device, the sink device assembles the IP packets into the TCP stream. When the nonce N and the E-EMI are extracted from this stream, the encryption key $K_c$ is calculated using the nonce $N_c$, the E-EMI, and thus the shared key $K_x$, and the received encrypted content can be decoded. Then, a process such as reproduction, copy, or movement can be performed on the content of plaintext after the decoding.

C. Exchange of Shared Key According to Security Level

As illustrated in FIGS. 7 to 12, the DTCP specification and the DTCP-IP specification can provide the technology for transmitting content as digital data securely. In recent years, due to the fact that high-value content with high quality such as content with a 4K resolution is a transmission target, there is more of a demand than ever to reinforce security.

In order to reinforce security of a content protection system, changing an encryption scheme to be used is considered, for example, a key length can be lengthened (for example, see Patent Literature 1). However, it takes much time and cost to switch the encryption scheme to a new encryption scheme. A suitable system transition period until complete substitution with a device supporting the new encryption scheme is necessary. Meanwhile, loss of compatibility with a device supporting only the existing encryption scheme is considered. Even in the content transmission system conforming to the DTCP specification and the DTCP-IP specification, the same problem arises when the encryption scheme is renewed.

Accordingly in the technology disclosed in the present specification, a load of the time or the cost is designed to be reduced by introducing a structure that performs transition to a safer system step by step. Specifically, by allowing a device of the transition step which implements the predetermined security reinforcement measure to handle high-value content only for a given system transition period, a problem of a time necessary for the transition can be avoided and the transition to the safer system can be performed smoothly.

The source device, that is, the authentication and key-sharing unit 306 on the side of the content transmission device 300, differentiates the shared key $K_{X2}$ handed to an existing sink device which does not implement the security reinforcement measure from the shared key $K_{X1}$ handed to a sink device which implements a predetermined security reinforcement measure.

Here, the device which implements the predetermined security reinforcement measure is, for example, a device which supports only an existing encryption algorithm and in which security of a weaker portion other than the encryption scheme is ensured, and is placed as a device of the transition step when a system is substituted with a new encryption scheme.

An existing encryption algorithm is applied to content transmission between devices of the transition step without change. However, by setting the dedicated shared key $K_{X1}$, high-value content can be handled. This is because the high-value content encrypted based on the share key $K_{X1}$ may not be decoded since the existing device has only the shared key $K_{X2}$.

Neither a device which implements the predetermined security reinforcement measure nor a device which does not implement the predetermined security reinforcement measure supports a new encryption algorithm, and an existing encryption algorithm is applied to both. A difference of whether to implement the predetermined security reinforcement measure is related to, for example, mounting robustness. More specifically, a device in which security can be mounted by only software may not be said to implement the security reinforcement measure. However, a device in which highly confidential information such as a device key is protected by hardware can be said to implement the security reinforcement measure.

Instead of the shared key $K_x$ for generating an encryption key with an existing key length, the shared key $K_{X\_NEW}$ for generating an encryption key with a long key length is shared between a source device and a sink device supporting a new encryption scheme. Accordingly, high-value content can be transmitted more securely using an encryption key with a long key length generated from the shared key $K_{X\_NEW}$ between the devices supporting the new encryption scheme.

Figure 13:
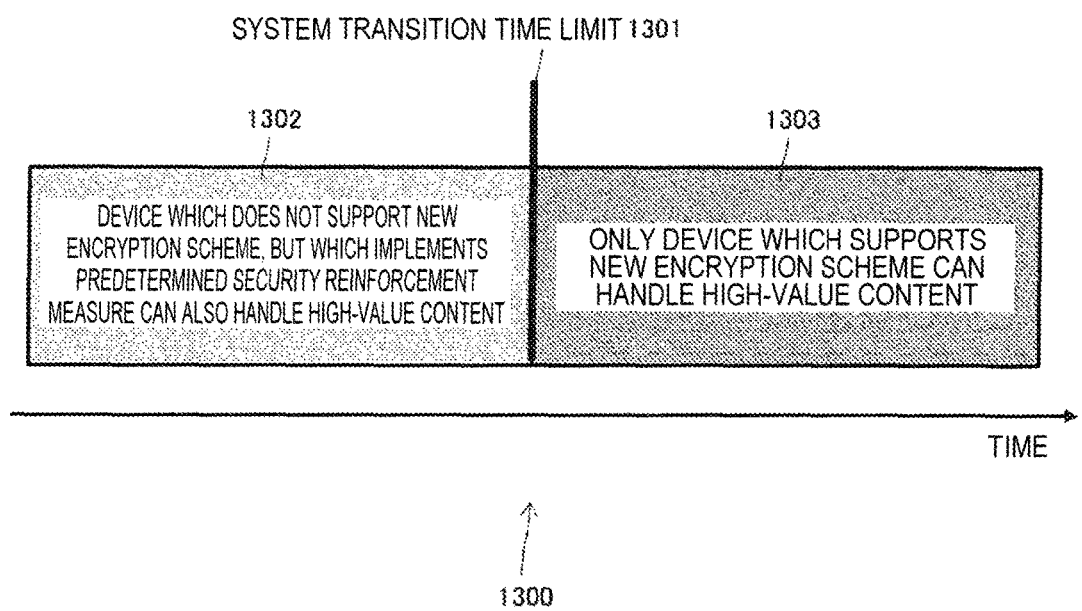
FIG. 13 is a diagram schematically illustrating a time chart 1300 in which the content transmission system switches an encryption scheme from an existing encryption scheme to a new encryption scheme.

FIG. 13 schematically illustrates a time chart 1300 in which the content transmission system switches an encryption scheme from an existing encryption scheme to a new encryption scheme.

During a period 1302 before a system transition time limit 1301, a device which does not support the new encryption scheme, but implements the predetermined security reinforcement measure is also permitted to handle high-value content.

In contrast, during a period 1303 after the system transition time limit 1301 has passed, the device that handles the high-value content necessarily supports the new encryption scheme. Accordingly, the device which supports only the existing encryption scheme may not handle the high-value content, irrespective of whether the predetermined security reinforcement measure is implemented. The device which can handle the high-value content produced before the system transition time limit 1301 can handle the high-value content according to the existing encryption scheme even after the system transition time limit 1301. However, after the system transition time limit 1301, the high-value content is gradually not used in the long run according to the existing encryption scheme since the devices handling the high-value content all support the new encryption scheme and further the devices supporting the new encryption scheme normally use the new encryption scheme.

For example, an administrator of the content transmission system may set the appropriate system transition time limit 1301 in consideration of a balance of a request of a high-value content producer and supplier requesting security reinforcement and a request to reduce a load of time and cost in a change of an encryption scheme of a device vendor or the like.

FIG. 14 illustrates a correspondence relation of encryption schemes and transmittable content between the source and sink devices. Here, in the drawing, the source and sink devices supporting the new encryption scheme are assumed to support the existing encryption scheme as well and ensure compatibility.

The source device which supports the existing encryption scheme and does not implement the predetermined security reinforcement measure may not handle the high-value content by itself at first. Accordingly, the source device does not transmit the high-value content to the sink device which does not implement the predetermined security reinforcement measure, the sink device which implements the predetermined security reinforcement measure, and the sink device which supports the new encryption scheme, but can only transmit content other than the high-value content according to the existing encryption scheme (C1401, C1402, and C1403).

The source device which implements the predetermined security reinforcement measure can switch the shared key from $K_{X2}$ to $K_{X1}$ and transmit the high-value content to the sink device which implements the predetermined security reinforcement measure and the sink device which supports the new encryption scheme according to the existing encryption scheme (C1412 and C1413). However, the source device can only transmit content other than the high-value content to the sink device which does not implement the predetermined security reinforcement measure according to the existing encryption scheme (C1411).

The source device which supports the new encryption scheme can switch the shared key from $K_{X2}$ to $K_{X1}$ and transmit the high-value content to the sink device which implements the predetermined security reinforcement measure according to the existing encryption scheme (C1422), and can transmit the high-value content to the sink device which supports the new encryption scheme according to the new encryption scheme (C1423). However, the source device can only transmit content other than the high-value content to the sink device which does not implement the predetermined security reinforcement measure according to the existing encryption scheme (C1421).

When the source device transmits the high-value content, the source device necessarily knows whether the sink device of a transmission destination implements the predetermined security reinforcement measure (whether security of a weaker portion other than the encryption scheme is ensured) or whether the sink device supports the new encryption scheme. The sink device which supports the new encryption scheme may not instruct the encryption scheme when the sink device does not know whether the source device which is a high-value content request destination supports the new encryption scheme.

In the embodiment, an ES flag indicating whether the device implements the predetermined security reinforcement measure (whether security of a weaker portion other than the encryption scheme is ensured) is defined. The device which implements the predetermined security reinforcement measure writes the ES flag=1 in a message to be transmitted from the device and notifies a partner that the predetermined security reinforcement measure is implemented. Conversely, the device writes the ES flag=0 when the device does not implement the predetermined security reinforcement measure (security of the weak portion is not ensured).

Figure 16:
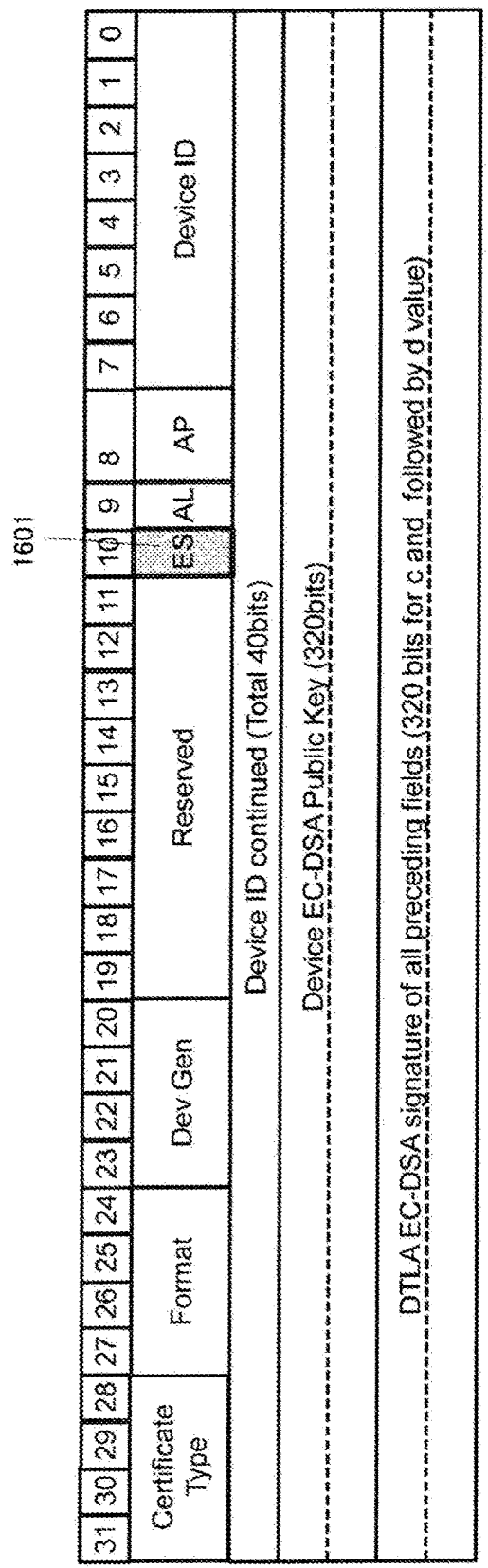
FIG. 16 is a diagram illustrating a form in which an ES flag is defined in the device certificate.

For example, the ES flag can be defined in, for example, the device certificate. FIG. 16 illustrates a form in which the ES flag is defined at a position reserved in the current specification, as indicated by reference numeral 1601 in the device certificate.

The device certificate is a certificate which is provided from DTLA to each device conforming to DTCP. The sink device can notify the source device that the predetermined security reinforcement measure is implemented (whether security of a weaker portion other than the encryption scheme is ensured), for example, by storing the ES flag in the device certificate sent with the CHALLENGE subfunction message (SEQ 703) in the full authentication illustrated in FIG. 7. Even in the RA-AKE procedure illustrated in FIG. 8, the sink device can notify the source device that the predetermined security reinforcement measure is implemented (whether security of a weaker portion other than the encryption scheme is ensured) according to the same method.

The MOVE RTT-AKE procedure illustrated in FIG. 9 or the Protected RTT Protocol procedure illustrated in FIG. 10 includes the sequence from the transmission of the CHALLENGE command from the sink device to the transmission of the response from the sink device to the transmission of RESPONSE or RESPONSE2 from the source device in the processing phase (SEQ 905 and SEQ 1000) written as "Challenge-Response portion." However, by storing the ES flag in the device certificate sent here, it is possible to notify the source device that the predetermined security reinforcement measure is implemented (whether security of a weaker portion other than the encryption scheme is ensured).

Figure 17:
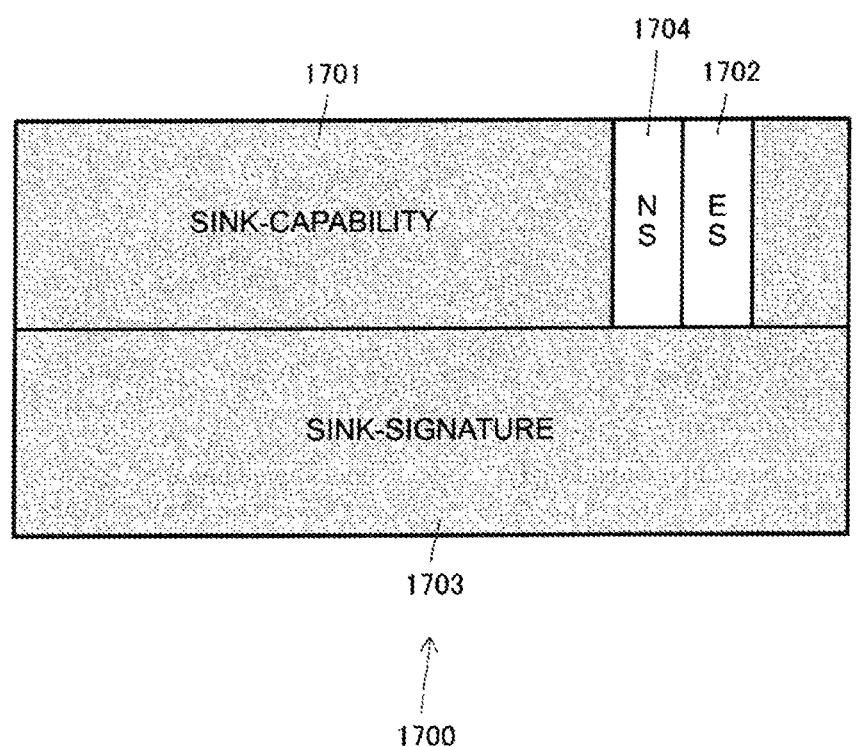
FIG. 17 is a diagram illustrating a specific configuration example of a payload including an ES flag and an NS flag.

A method of including the ES flag not only in the device certificate, as illustrated in FIG. 16, but also in a command sent during the AKE process of DTCP and sending the ES flag can also be considered. FIG. 17 illustrates a specific configuration example of a payload sent with this command. An ES flag 1702 is stored in a SINK-CAPABILITY field 1701 of a payload 1700. Further, falsification during transmission is prevented by an accompanying SINK-SIGNATURE field 1703 including an electronic signature calculated in regard to data of the foregoing SINK-CAPABILITY field 1701 using a device private key (secret key) of the sink device.

Here, the SINK-CAPABILITY field 1701 includes not only the ES flag 1702 but also an NS flag 1704. The NS flag is a flag that is defined to indicate whether a device supports a new encryption scheme (New System) The sink device supporting the new encryption scheme writes the NS flag=1 and notifies a partner of the NS flag. The sink device which can handle the high-value content is assumed to necessarily send a command including the NS flag during the AKE process when the sink device does not support or supports the new encryption scheme. During the AKE process, the source device confirms that the command including the NS flag is received during the AKE process when the ES flag of Sink is 1. When the source device may not confirm the command, the source device determines that the AKE process is an abnormal AKE process. For example, when the sink device stores the ES flag in the device certificate to transmit the ES flag (see FIG. 16) and the source device may not receive the command including the NS flag during the AKE process, the source device assumes that an error has occurred and interrupts the AKE process.

The sink device can include data 1700 illustrated in FIG. 17 in, for example, the payload of the CAPABILITY_EXCHANGE.CMD message (SEQ 903) during the MOVE RTT-AKE procedure illustrated in FIG. 9 to send the data 1700.

Though the detailed description is omitted, the sink device can send the data 1700 illustrated in FIG. 17 even during the RTT-AKE process or the prior registration process at the time of the remote access. Even in the other AKE processes (for example, the RA-AKE), the sink device can send the data 1700 illustrated in FIG. 17.

Figure 18:
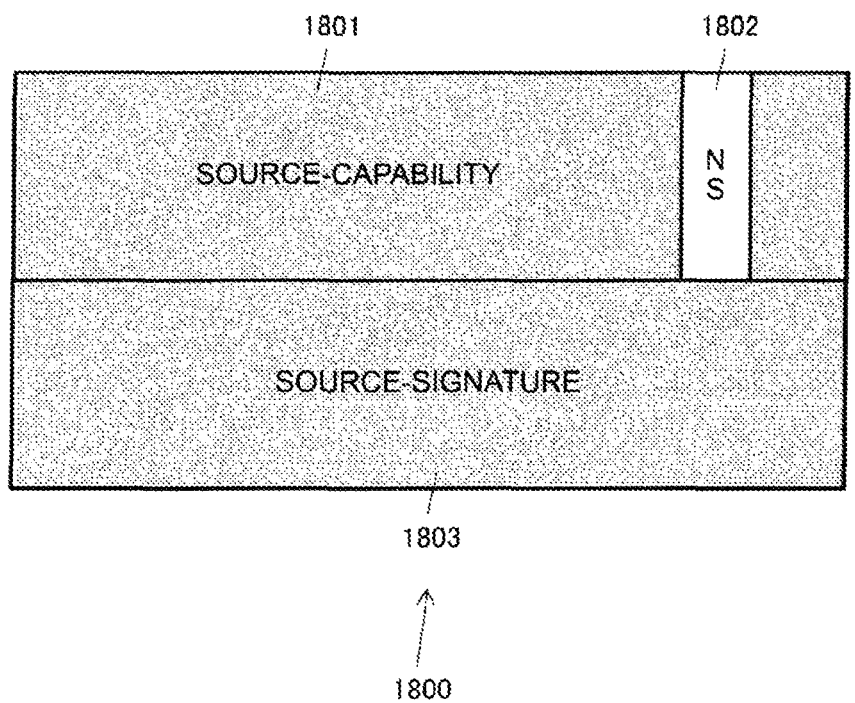
FIG. 18 is a diagram illustrating a specific configuration example of a payload including an NS flag.

On the other hand, the source device can store the NS flag in a payload sent as a response to the command illustrated in FIG. 17 to indicate whether the source device supports the new encryption scheme. FIG. 18 is a diagram illustrating a specific configuration example of a payload including an NS flag.

An NS flag 1802 is stored in a SOURCE-CAPABILITY field 1801 of a payload 1800. The source device supporting the new encryption scheme writes the NS flag=1 and notifies a partner of the NS flag. Further, falsification during transmission is prevented by an accompanying SOURCE-SIGNATURE field 1803 including an electronic signature calculated in regard to data of the foregoing SOURCE-CAPABILITY field 1801 using a device private key (secret key) of the source device.

The source device that implements the predetermined security reinforcement measure determines whether either of a common key $K_{X1}$ capable of handling the high-value content or a common key $K_{X2}$ not capable of handling the high-value content is handed to the sink device with reference to the ES flag received from the sink device in the format illustrated in FIG. 16 or 17.

Figure 19:
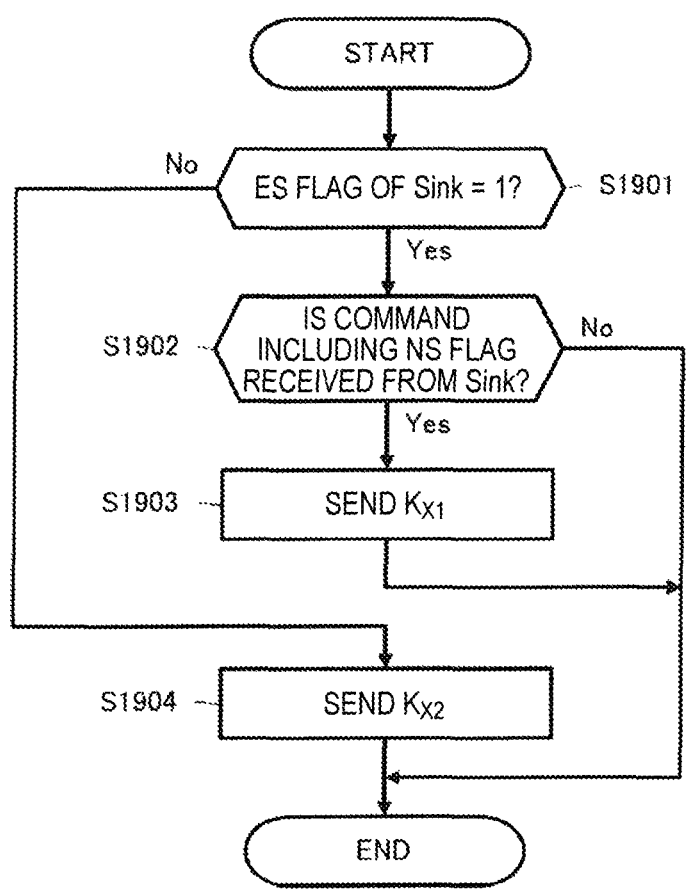
FIG. 19 is a flowchart illustrating a processing order in which the source device decides a common key.

FIG. 19 illustrates a processing order in which the source device decides the common key in the form of a flowchart. This process is performed mainly by the authentication and key-sharing unit 306 in the source device.

The authentication and key-sharing unit 306 first checks whether the ES flag sent from the sink device is 1 (step S1901).

Here, when the ES flag is not 1 (No in step S1901), the authentication and key-sharing unit 306 generates the common key $K_{X2}$ not capable of handling the high-value content and sends the common key $K_{X2}$ from the communication and control unit 301 to the sink device (step S1904). In this case, the source device can transmit only content other than the high-value content to the sink device.

Conversely, when the ES flag is 1 (Yes in step S1901), the authentication and key-sharing unit 306 further checks whether the command including the NS flag is received during the AKE process (step S1902).

When the command including the NS flag may not be received during the AKE process (No in step S1902), the authentication and key-sharing unit 306 assumes that an error has occurred and interrupts the AKE process.

Conversely, when the command including the NS flag can be received during the AKE process (Yes in step S1902), the authentication and key-sharing unit 306 generates the common key $K_{X1}$ capable of handling the high-value content and sends the common key $K_{X1}$ from the communication and control unit 301 to the sink device (step S1903).

To realize content transmission at a higher security level, it is preferable that both of the source device and the sink device preferentially perform the new encryption scheme. This leads to earlier complete transition to the new encryption scheme.

Figure 20:
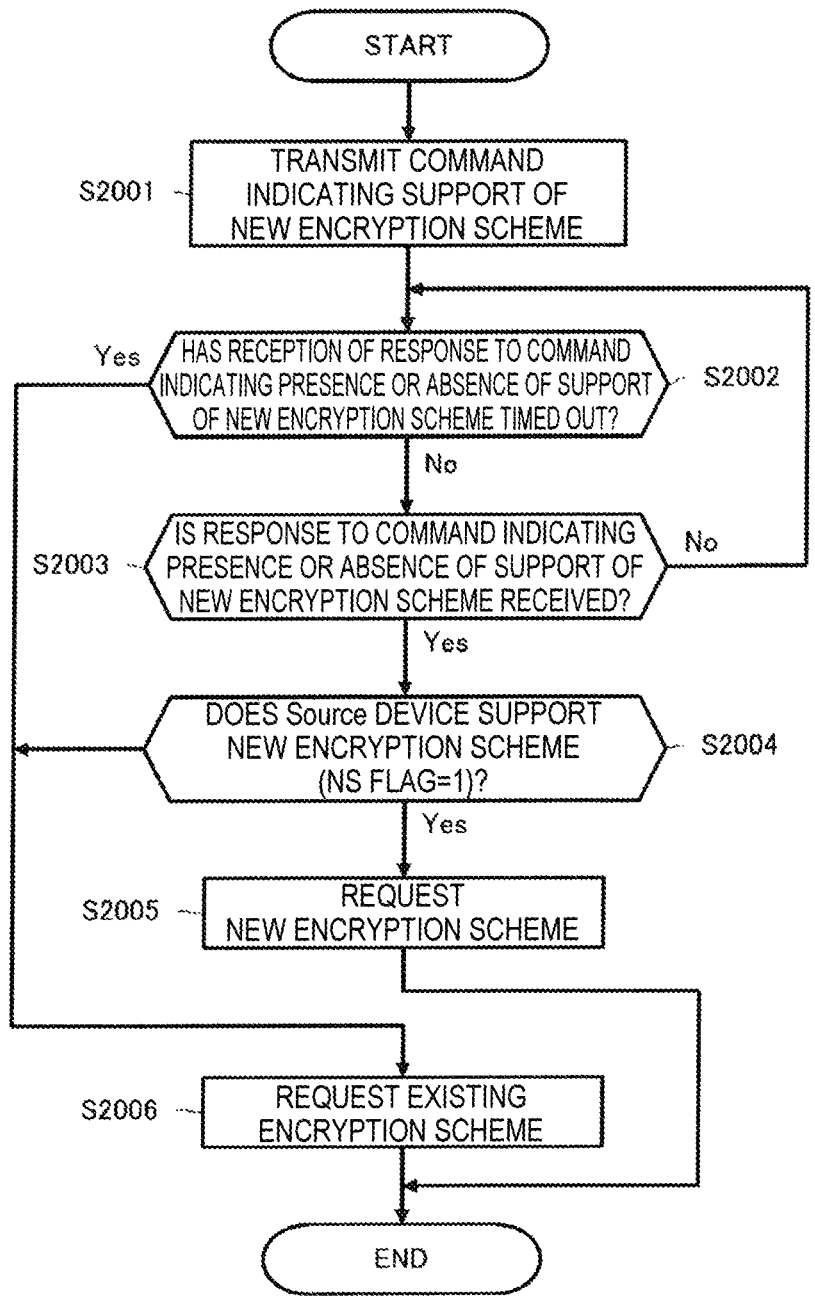
FIG. 20 is a flowchart illustrating a processing order in which a sink device side preferentially performs a new encryption scheme.

FIG. 20 illustrates a processing order in which the sink device side preferentially performs the new encryption scheme in the form of a flowchart. This process is performed during the AKE process by the authentication and key-sharing unit 406 in the sink device that supports the new encryption scheme.

The authentication and key-sharing unit 406 transmits the command storing the NS flag=1 to the source device via the communication and control unit 401 during the AKE process to indicate that the sink device supports the new encryption scheme (step S2001).

Subsequently, until the reception of a response to a command indicating the presence or absence of the new encryption scheme has timed out (that is, storing the NS flag) (No in step S2002), the authentication and key-sharing unit 406 waits to receive the response to the command indicating presence or absence of the new encryption scheme from the source device via the communication and control unit 401 (No in step S2003).

Here, when the reception of the response to the command indicating the presence or absence of the new encryption scheme has timed out (Yes in step S2002), the authentication and key-sharing unit 406 determines that the source device does not support the new encryption scheme and requests the source device to transmit content according to the existing encryption scheme via the communication and control unit 401 (step S2006).

Conversely, when the response to the command indicating the presence or absence of the new encryption scheme may be received from the source device (Yes in step S2003), the authentication and key-sharing unit 406 checks whether the source device supports the new encryption scheme with reference to the NS flag stored in the response to the command (step S2004).

When it is known from the NS flag=1 that the source device supports the new encryption scheme (Yes in step S2004), the authentication and key-sharing unit 406 requests the source device to transmit the content according to the new encryption scheme via the communication and control unit 401 (step S2005).

Conversely, when it is known from the NS flag=0 that the source device does not support the new encryption scheme (No in step S2004), the authentication and key-sharing unit 406 determines that the source device does not support the new encryption scheme and requests the source device to transmit the content according to the existing encryption scheme via the communication and control unit 401 (step S2006).

Figure 21:
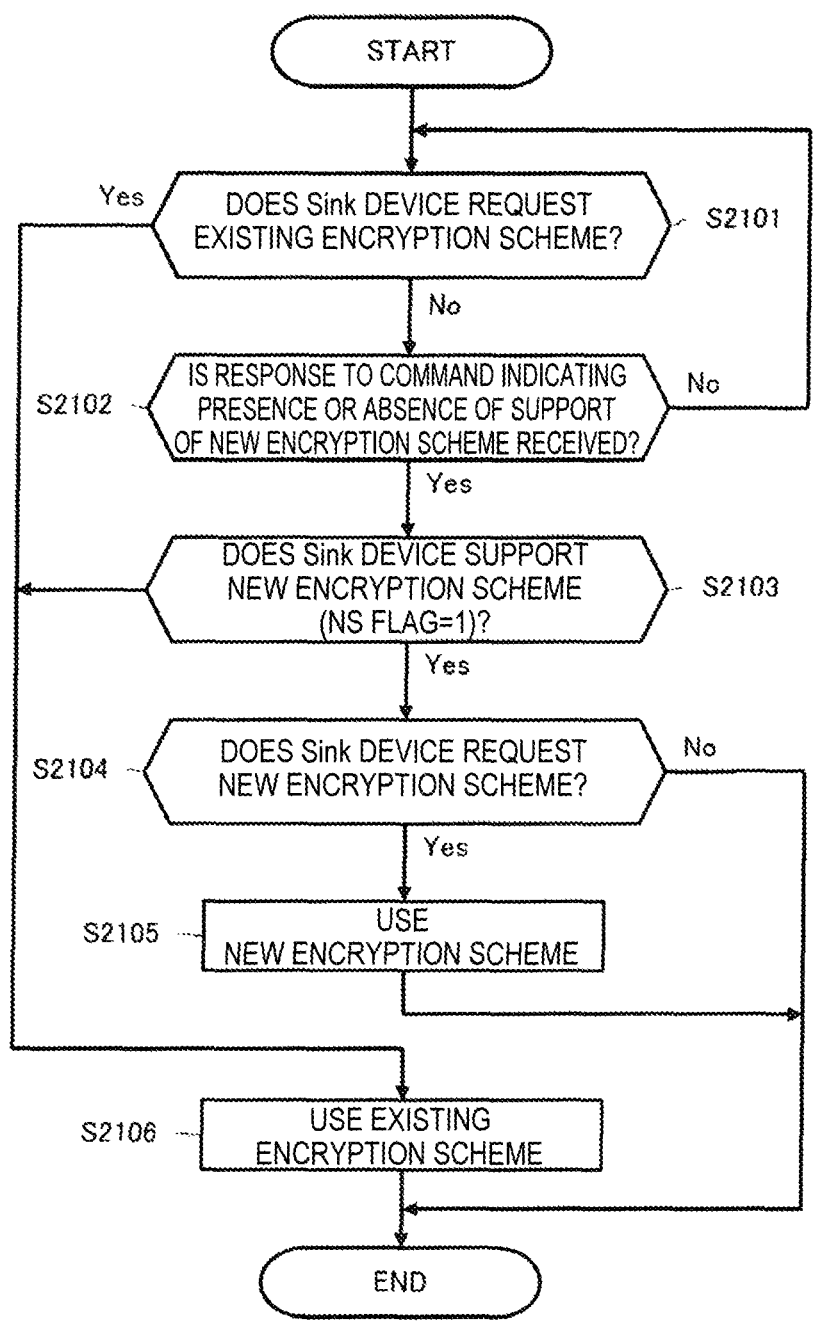
FIG. 21 is a flowchart illustrating a processing order in which a source device side preferentially performs a new encryption scheme.

FIG. 21 illustrates a processing order in which the source device side preferentially performs the new encryption scheme in the form of a flowchart. This process is performed during the AKE process by the authentication and key-sharing unit 306 in the source device that supports the new encryption scheme.

The authentication and key-sharing unit 306 first checks whether the sink device requests the source device to transmit content according to the existing encryption scheme (step S2101).

Here, when the sink device requests the source device to transmit the content according to the existing encryption scheme (Yes in step S2101), the authentication and key-sharing unit 306 decides to use the existing encryption scheme to transmit the content to the sink device (step S2106).

Conversely, when the sink device does not request the source device to transmit the content according to the existing encryption scheme (No in step S2101), the authentication and key-sharing unit 306 waits to receive the command indicating the presence or absence of the new encryption scheme (that is, storing the NS flag) via the communication and control unit 301 (No in step S2102).

When the authentication and key-sharing unit 306 receives the command indicating the presence or absence of the new encryption scheme (Yes in step S2102), the authentication and key-sharing unit 306 checks whether the sink device supports the new encryption scheme with reference to the NS flag stored in the command (step S2103).

When the sink device supports the new encryption scheme (Yes in step S2103), the authentication and key-sharing unit 306 further checks whether the sink device requests the source device to transmit the content according to the existing encryption scheme (step S2104). When the sink device requests the source device to transmit the content according to the existing encryption scheme (Yes in step S2104), the authentication and key-sharing unit 306 decides to use the new encryption scheme to transmit the content to the sink device (step S2105).

Conversely, when the sink device does not support the new encryption scheme (No in step S2103) or the sink device does not request the source device to transmit the content according to the existing encryption scheme (No in step S2104), the authentication and key-sharing unit 306 decides to use the existing encryption scheme to transmit the content to the sink device (step S2106).

As described above, the content transmission system to which the technology disclosed in the present specification is applied is designed to reduce the load of time or cost of performing the transition to the safer system step by step in which the encryption scheme is renewed. That is, the device (for example, the device which supports only the existing encryption algorithm, but ensures security of a weaker portion other than the encryption scheme) of the transition step which implements the predetermined security reinforcement measure is configured to handle the high-value content only for the given system transition period. As a result, the problem of a time necessary for the transition can be avoided and the transition to the safer system can be performed smoothly. A processing capability of the device per cost tends to increase generally year by year, and thus a load of an encryption algorithm for which a larger calculation amount is necessary is also highly likely to be reduced by the foregoing long-term support.

Accordingly, according to the technology disclosed in the present specification, even for the given period in which both of the content transmission device and the content reception device completely transition to the new encryption scheme, the complete transition to a safer new system can be performed in the long run without imposing a large load on the devices while the security of the content is maintained by currently indispensable modes of protection.

Specific examples of the content transmission device operating as the source device of the DTCP or the server 201 in the content transmission system 200 illustrated in FIG. 2 include a set-top box, a recorder, a television receiver, a personal computer, or a network access server (NAS).

Figure 23:
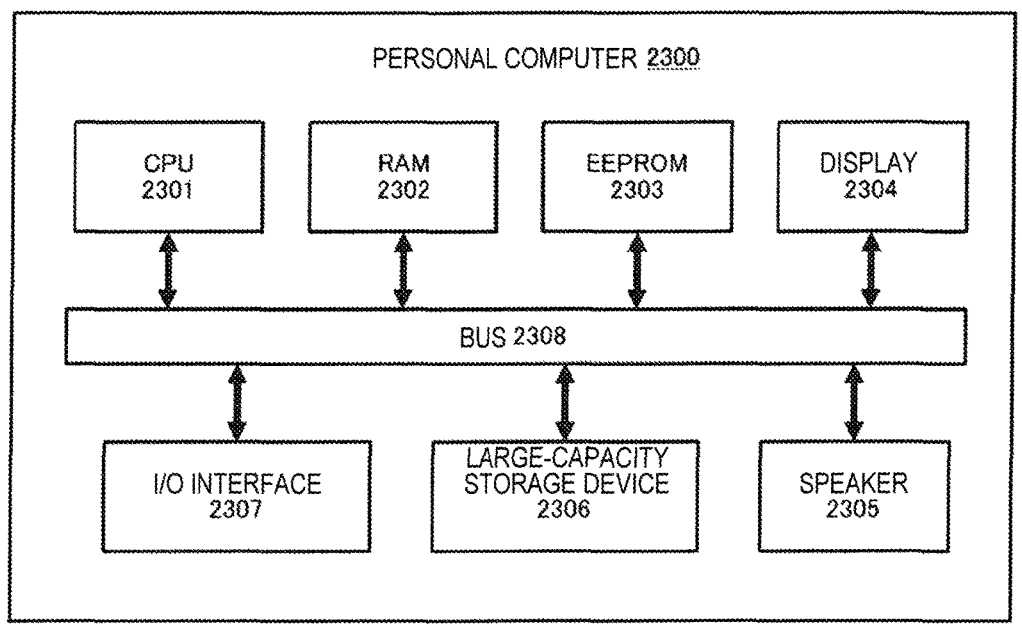
FIG. 23 is a diagram illustrating an example of the configuration of a personal computer 2300 which can operate as a server 201 or a source device of DTCP.

FIG. 23 is a diagram illustrating an example of the configuration of a personal computer 2300 which can operate as the server 201 or the source device of DTCP. The personal computer 2300 is assumed to support the remote access function (described above). The personal computer 2300 illustrated in the drawing includes a central processing unit (CPU) 2301, a random access memory (RAM) 2302, an electrically erasable and programmable ROM (EEPROM) 2303, a display 2304, a speaker 2305, a large-capacity information storage device 2306 such as a hard disc drive (HDD) or a super density disc (SDD), and circuit components such as an I/O interface 2307. The circuit components are mutually connected via a bus 2308.

The CPU 2301 reads and executes a program loaded to the RAM 2302 serving as a main memory.

Functions related to encryption and decoding of content are loaded to the RAM 2302. For example, a program for performing the DTCP+ function and a program for performing the RA-AKE process are loaded to the RAM 2302.

The EEPROM 2303 is a rewritable non-volatile storage device and stores setting formation or the like. When the personal computer 2300 operates as the source device, that is, the content transmission device, the RAC record including the sink-ID of the sink device is stored in an EEPROM 2503.

On the personal computer 2300, a CPU 2501 reads a program in which the AKE process of the DTCP+ is described from the RAM 2302 and performs the AKE procedure with the sink device when a request to register the sink device as a terminal capable of gaining the remote access is received from the sink device. When this procedure is successful, the CPU 2301 generates an exchange key $K_R$ and a label $K_R$_label of the exchange key according to a program stored in the RAM 2302 and stores the exchange key $K_R$ and the label $K_R$_label as the RAC record associated with the sink ID in the EEPROM 2303.

Thereafter, on the personal computer 2300, the CPU 2301 performs a process of comparing the sink-ID of the sink device sending a request of the RA-AKE process to the sink-ID stored in the EEPROM 2303 and deciding whether the RA-AKE process is completed when the request of the RA-AKE process is received.

Then, when the RA-AKE process is completed, an exchange key common to the personal computer 2300 and the sink device sending the request of the RA-AKE process is generated. On the side of the personal computer 2300, a content key generated based on the exchange key is temporarily stored. When content is read from the large-capacity information storage device 2306, the content is encrypted with the temporarily stored content key. The encrypted content is output to the outside via an I/O interface 2308. When the I/O interface 2308 has a wireless LAN function, the encrypted content is transmitted to the sink device sending the request of the RA-AKE process via the wireless IAN.

Figure 24:
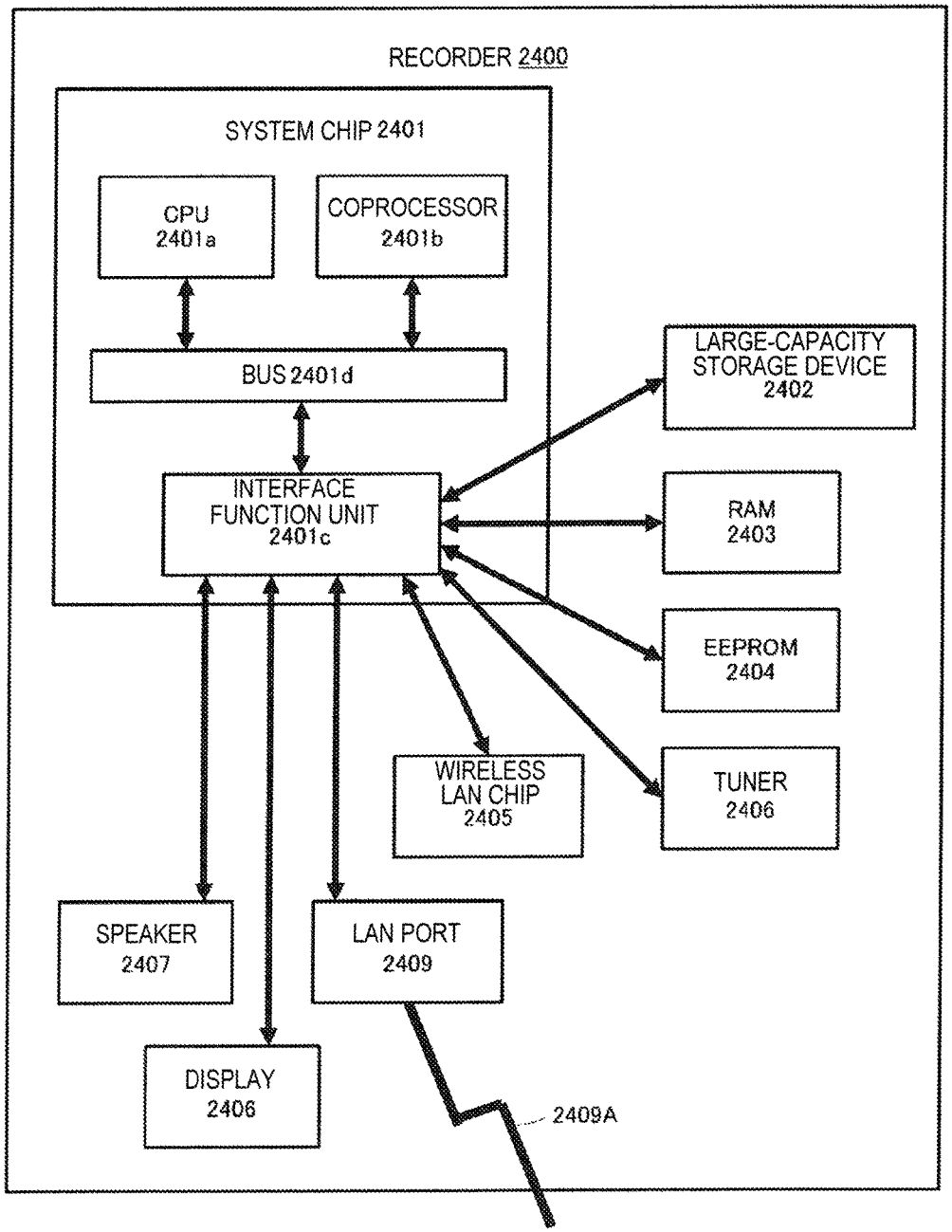
FIG. 24 is a diagram illustrating an example of the configuration of a recorder 2400 which can operate as the server 201 or the source device of DTCP.

FIG. 24 illustrates an example of the configuration of a recorder 2400 which can operate as the server 201 or the source device of the DTCP. The recorder 2400 is assumed to support the remote access function (described above). The recorder 2400 illustrated in the drawing includes a system chip 2401, a large-capacity storage device 2402, a RAM 2403, an EEPROM 2404, at least one of a wireless LAN chip 2405 and a LAN port 2409, a tuner 2406, a display 2407, and a speaker 2408.

The system chip 2401 includes circuit modules such as a CPU 2401*a*, a coprocessor 2401*b*, and an interface function unit 2401*c*. These circuit modules are mutually connected via a bus 2401*d* in the system chip.

The CPU 2401*a* can execute a program stored in a storage device connected via the interface function unit 2401*c*.

The coprocessor 2401*b* is an auxiliary calculation device and mainly performs a process of compressing and decoding a moving image. For example, the coprocessor 2401*b* performs an algorithm such as H264, VC1, MPET2, or JPEG. When moving-image content (stored in the large-capacity storage device 2402) is transmitted to the content reception device such as the sink device, the coprocessor 2401*b* performs a process of converting the size of an image according to a communication environment such as a communication speed and transmitting the image with an optimum size for the communication environment, that is, transcoding of a codec. The transcoding of the codec enables delay of reproduction in a content transmission destination such as the sink device to be reduced. Here, the transcoding of the codec can also be performed by the CPU 2401*a* rather than dedicated hardware such as the coprocessor 2401*b*. A compression ratio at which content is subjected to the transcoding can also be designated for individual content by a user.

The large-capacity storage device 2402 is, for example, an HDD or an SDD and stores content to be supplied to the sink device or the content reception device.

The tuner 2406 tunes and receives a broadcast signal of a terrestrial digital broadcast or the like. In the embodiment, a program is recorded or a recording reservation is made according to, for example, a function of an electronic program guide (EPG) or the like and broadcast content is stored in the large-capacity storage device 2402.

A broadcast program received with the tuner 2406 or content stored in the large-capacity storage device 2402 can also be viewed and heard using the display 2407 and the 2408.

The wireless LAN chip 2405 performs processes of a physical layer and Media Access Control (MAC) layer in, for example, a wireless LAN standard such as Wireless Fidelity (Wi-Fi) or IEEE802.11 and performs wireless connection with the content reception device serving as the sink device directly or via a predetermined access point. The LAN port 2409 is connected to a wired LAN (not illustrated) such as Ethernet (registered trademark) via an inserted LAN cable 2409A and performs processes of a physical layer and a MAC layer of, for example, a wired LAN standard such as IEEE802.3 to communicate with the content reception device serving as the sink device.

A program executed by the CPU 2401*a* is loaded to the RAM 2403 serving as a main memory. A main program loaded to the RAM 2403 is a program that realizes functions related to encryption and decoding of content. For example, a program for performing the DTCP+ function and a program for performing the RA-AKE process is loaded to the RAM 2403.

The EEPROM 2404 is a rewritable non-volatile storage device and stores setting formation or the like. When the recorder 2400 operates as the source device, that is, the content transmission device, the RAC record including the sink-ID of the sink device is stored in an EEPROM 2404.

On the recorder 2400, a CPU 2401*a* reads a program in which the AKE process of the DTCP-IP is described from the RAM 2403 and performs the AKE procedure with the sink device when a request to register the sink device as a terminal capable of gaining the remote access is received from the sink device. When this procedure is successful, the CPU 2401*a* generates an exchange key $K_R$ and a label $K_R$_label of the exchange key according to a program stored in the RAM 2403 and stores the exchange key $K_R$ and the label $K_R$_label as the RAC record associated with the sink ID in the EEPROM 2404.

Thereafter, on the recorder 2400, the CPU 2401*a* performs a process of comparing the sink-ID of the sink device sending a request of the RA-AKE process to the sinkID of the sink device stored in the EEPROM 2404 and deciding whether the RA-AKE process is completed when the request of the RA-AKE process is received.

Then, when the RA-AKE process is completed, a content key common to the recorder 2400 and the sink device sending the request of the RA-AKE process is generated. On the side of the recorder 2400, the generated content key is temporarily stored. When content is read from the large-capacity information storage device 2402, the content is encrypted with the temporarily stored content key. The encrypted content passes through the interface function unit 2401c and the wireless LAN chip 2405 and the encrypted content is transmitted to a terminal sending the request of the RA-AKE process.

Figure 25:
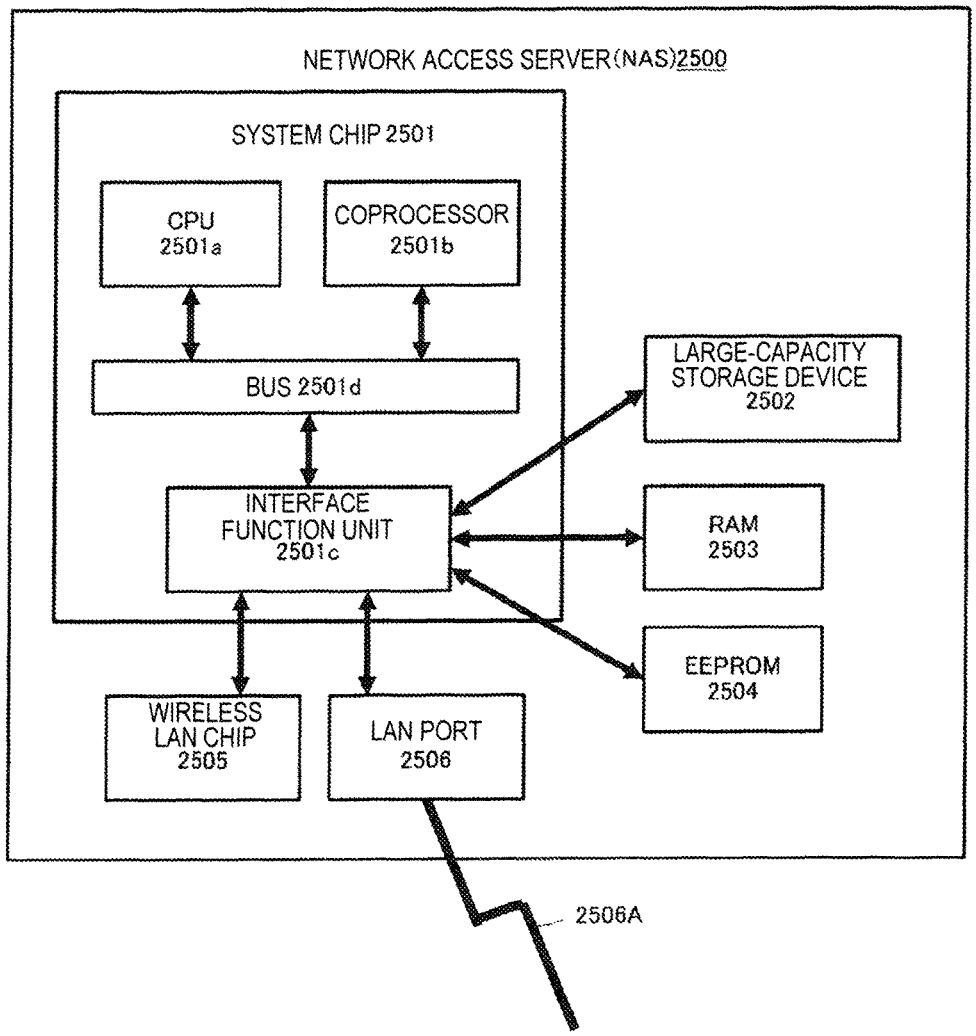
FIG. 25 is a diagram illustrating an example of the configuration of a network access server (NAS) 2500 which can operate as the server 201 or the source device of DTCP.

FIG. 25 illustrates an example of the configuration of a network access server (NAS) 2500 which can operate as the server 201 or the source device of the DTCP.

The network access server 2500 includes a large-capacity storage device, is installed in the home network 110 or 210, and transmits information in the large-capacity storage device according to an IP protocol. For example, broadcast content recorded with the recorder 2500 can be dubbed in the network access server 2500 or content stored in the network access server 2500 can be transmitted to the sink device such as the personal computer 2300 or a smartphone to be viewed and heard. The network access server 2500 is assumed to also support the remote access function.

The network access server 2500 illustrated in the drawing includes a system chip 2501, a large-capacity storage device 2502, a RAM 2503, an EEPROM 2504, and at least one of a wireless LAN chip 2505 and a LAN port 2506.

The system chip 2501 includes circuit modules such as a CPU 2501a, a coprocessor 2501b, and an interface function unit 2501c. These circuit modules are mutually connected via a bus 2501d in the system chip.

The CPU 2501a can execute a program stored in a storage device connected via the interface function unit 2501c.

The coprocessor 2501b is an auxiliary calculation device and mainly performs a process of compressing and decoding a moving image. For example, the coprocessor 2401b performs an algorithm such as H264, VC1, MPET2, or JPEG. When moving-image content (stored in the large-capacity storage device 2502) is transmitted to the content reception device such as the sink device, the coprocessor 2501b performs a process of converting the size of an image according to a communication environment such as a communication speed and transmitting the image with an optimum size for the communication environment, that is, transcoding of a codec. The transcoding of the codec enables delay of reproduction in a content transmission destination such as the sink device to be reduced. Here, the transcoding of the codec can also be performed by the CPU 2501a rather than dedicated hardware such as the coprocessor 2501b. A compression ratio at which content is subjected to the transcoding can also be designated for individual content by a user.

The large-capacity storage device 2502 is, for example, an HDD or an SDD and stores content to be supplied to the sink device or the content reception device. For example, broadcast content recorded with the network access server 2500 can be dubbed in the large-capacity storage device 2502 (received via the wireless LAN chip 2705).

The wireless LAN chip 2505 performs processes of a physical layer and Media Access Control (MAC) layer in, for example, a wireless LAN standard such as Wireless Fidelity (Wi-Fi) or IEEE802.11 and performs wireless connection with the content reception device serving as the sink device directly or via a predetermined access point. The LAN port 2506 is connected to a wired LAN (not illustrated) such as Ethernet (registered trademark) via an inserted LAN cable 2506A and performs processes of a physical layer and a MAC layer of, for example, a wired LAN standard such as IEEE802.3 to communicate with the content reception device serving as the sink device.

A program executed by the CPU 2501a is loaded to the RAM 2503 serving as a main memory. A main program loaded to the RAM 2503 is a program that realizes functions related to encryption and decoding of content. For example, a program for performing the DTCP-IP function and a program for performing the RA-AKE process is loaded to the RAM 2503.

The EEPROM 2504 is a rewritable non-volatile storage device and stores setting formation or the like. When the network access server 2500 operates as the source device, that is, the content transmission device, the RAC record including the sink-ID of the sink device is stored in an EEPROM 2504.

On the network access server 2500, a CPU 2501a reads a program in which the AKE process of the DTCP+ is described from the RAM 2503 and performs the AKE procedure with the sink device when a request to register the sink device as a terminal capable of gaining the remote access is received from the sink device. When this procedure is successful, the CPU 2501a adds an exchange key $K_R$ and a label $K_R$_label of the exchange key according to a program stored in the RAM 2503 and stores the exchange key $K_R$ and the label $K_R$_label in pair with the sink ID in the EEPROM 2504.

Thereafter, on the network access server 2500, the CPU 2501a performs a process of comparing the sink-ID) of the sink device sending a request of the RA-AKE process to the sinkID of the sink device stored in the EEPROM 2504 and deciding whether the RA-AKE process is completed when the request of the RA-AKE process is received.

Then, when the RA-AKE process is completed, a content key common to the network access server 2500 and the sink device sending the request of the RA-AKE process is generated. On the side of the network access server 2500, the generated content key is temporarily stored. When content is read from the large-capacity information storage device 2502, the content is encrypted with the temporarily stored content key. The encrypted content passes through the interface function unit 2501c and the wireless LAN chip 2505 and the encrypted content is transmitted to a terminal sending the request of the RA-AKE process.

CITATION LIST

Patent Literature

Patent Literature 1: JP 2009-267900A

INDUSTRIAL APPLICABILITY

So far, the embodiment of the present disclosure has been described in detail with reference to a specific embodiment. However, it should be noted that various variations and alternative embodiments will become apparent to those skilled in the art without departing from the scope of the present disclosure.

In the present specification, the technology disclosed in the present specification has been described focusing on the embodiments applied to the network of the DTCP specification and the DTCP-IP specification, but the gist of the technology disclosed in the present specification is not limited thereto. The technology disclosed in the technology disclosed in the present specification can also be applied similarly to a content transmission system that moves content between devices on a network based on a technical specification other than DTCP or DTCP-IP.

That is, the technology disclosed in the present specification can be applied to systems of various transmission standards. Even for a given period in which all devices may not support a new encryption scheme, the security of the content can be maintained by currently indispensable modes of protection and the complete transition to a safer system can be performed in the long run without imposing a large load on the devices.

In short, the present technology has been disclosed in a form of illustration and should not be interpreted limitedly. To determine the gist of the present disclosure, patent claims should be taken into account.

Additionally, the present technology may also be configured as below.

(1)

A content transmission device including:

an authentication and key-sharing unit configured to perform mutual authentication and transferring of a shared key with a content reception device according to a predetermined transmission standard; and a content supply unit configured to encrypt and transmit content using an encryption key generated from the shared key to the content reception device, wherein the authentication and key-sharing unit switches the shared key to be transferred according to whether the content reception device has a predetermined security strength.

(2)

The content transmission device according to (1), wherein the predetermined transmission standard is Digital Transmission Content Protection (DTCP) or DTCP-IP (DTCP mapping to IP).

(3)

The content transmission device according to (1), wherein the authentication and key-sharing unit transfers a first shared key capable of handling first content to a content reception device which has the predetermined security strength and transfers a second shared key not capable of handling the first content to a content reception device which does not have the predetermined security strength.

(4)

The content transmission device according to (3), wherein the predetermined security reinforcement measure ensures security of a weaker portion other than an encryption scheme.

(5)

The content transmission device according to (3), wherein the content supply unit encrypts and transmits the first content with an encryption key generated from the first shared key and refrains from encrypting and transmitting the first content with an encryption key generated from the second shared key.

(6)

The content transmission device according to (3), wherein the first and second shared keys are shared keys for generating an encryption key according to a first encryption scheme, and wherein the authentication and key-sharing unit transfers the first or second shared key to a content reception device which supports only the first encryption scheme and transfers a shared key for generating an encryption key according to a second encryption scheme to a content reception device which supports the second encryption scheme.

(7)

The content transmission device according to (3), wherein the authentication and key-sharing unit determines whether the content reception device is a device that has the predetermined security strength based on an ES flag stored in a device certificate sent from the content reception device at the time of the mutual authentication.

(8)

The content transmission device according to (3), wherein the authentication and key-sharing unit determines whether the content reception device is a device that has the predetermined security strength based on an ES flag stored in a CAPABILITY field of a payload of a command sent from the content reception device at the time of the mutual authentication.

(9)

The content transmission device according to (8), wherein the authentication and key-sharing unit determines whether the content reception device supports the second encryption scheme based on an NS flag stored in a CAPABILITY field of a payload of a command sent from the content reception device at the time of the mutual authentication.

(10)

The content transmission device according to (8) or (9), wherein an electronic signature calculated from data of the CAPABILITY field using a secret key of the content reception device accompanies the CAPABILITY field.

(11)

The content transmission device according to (9), wherein the authentication and key-sharing unit assumes that an error has occurred and interrupts the mutual authentication process when the authentication and key-sharing unit confirms that the ES flag is stored in a device certificate sent from the content reception device and is not able to confirm the NS flag in a command at the time of the mutual authentication.

(12)

The content transmission device according to (3), wherein the authentication and key-sharing unit stores an NS flag indicating support or non-support of a second encryption scheme in a CAPABILITY field of a payload of a command to be sent to the content reception device at the time of the mutual authentication.

(13)

The content transmission device according to (12), wherein the authentication and key-sharing unit causes an electronic signature calculated from data of the CAPABILITY field using a secret key of the content transmission device to accompany the CAPABILITY field.

(14)

A content transmission method including:

an authentication and key-sharing step of performing mutual authentication and transferring of a shared key with a content reception device according to a predetermined transmission standard; and a content supply step of encrypting and transmitting content using an encryption key generated from the shared key to the content reception device, wherein, in the authentication and key-sharing step, the shared key to be transferred is switched according to whether the content reception device has a predetermined security strength.

(15)

A content reception device including:

an authentication and key-sharing unit configured to perform mutual authentication and reception of a shared key with a content transmission device according to a predetermined transmission standard; and a content acquisition unit configured to acquire content encrypted and transmitted using an encryption key generated from the received shared key, wherein the authentication and key-sharing unit receives a shared key according to that the computer has a predetermined security strength.

(16)

The content reception device according to (15), wherein the predetermined transmission standard is Digital Transmission Content Protection (DTCP) or DTCP-IP (DTCP mapping to IP).

(17)

The content reception device according to (15), wherein the authentication and key-sharing unit receives a first shared key capable of handling first content according to that the content reception device has a predetermined security strength, and wherein the content acquisition unit acquires the first content encrypted and transmitted with an encryption key generated from the first shared key (18)

The content reception device according to (15), wherein the predetermined security reinforcement measure ensures security of a weaker portion other than an encryption scheme.

(19)

The content reception device according to (15), wherein the authentication and key-sharing unit stores an ES flag indicating whether the content reception device has the predetermined security strength in a device certificate to be sent to the content transmission device at the time of the mutual authentication.

(20)

The content reception device according to (15), wherein the authentication and key-sharing unit stores an ES flag indicating whether the content reception device has the predetermined security strength in a CAPABILITY field of a payload of a command to be sent to the content transmission device at the time of the mutual authentication.

(21)

The content reception device according to (15), wherein the authentication and key-sharing unit stores an NS flag indicating whether the content reception device supports an encryption scheme in a CAPABILITY field of a payload of a command to be sent to the content transmission device at the time of the mutual authentication.

(22)

The content transmission device according to (20) or (21), wherein an electronic signature calculated from data of the CAPABILITY field using a secret key of the content reception device accompanies the CAPABILITY field.

(23)

A content reception method including:

an authentication and key-sharing step of performing mutual authentication and reception of a shared key with a content transmission device according to a predetermined transmission standard; and a content acquisition step of acquiring content encrypted and transmitted using an encryption key generated from the received shared key, wherein, in the authentication and key-sharing step, a shared key according to that a content reception device has a predetermined security strength is received.

(24)

A computer program described in a computer-readable format to cause a computer to function as:

an authentication and key-sharing unit configured to perform mutual authentication and transferring of a shared key with a content reception device according to a predetermined transmission standard; and a content supply unit configured to encrypt and transmit content using an encryption key generated from the shared key to the content reception device, wherein the authentication and key-sharing unit switches the shared key to be transferred according to whether the content reception device has a predetermined security strength.

(25)

A computer program described in a computer-readable format to cause a computer to function as:

an authentication and key-sharing unit configured to perform mutual authentication and reception of a shared key with a content transmission device according to a predetermined transmission standard; and a content acquisition unit configured to acquire content encrypted and transmitted using an encryption key generated from the received shared key, wherein the authentication and key-sharing unit receives a shared key according to that the computer has a predetermined security strength.

(26)

A content transmission system including:

a content transmission device and a content reception device configured to perform mutual authentication and exchange of a shared key and encrypt and transmit content using an encryption key generated from the shared key, wherein the content transmission device switches a shared key to be transferred according to whether the content reception device has a predetermined security strength.

REFERENCE SIGNS LIST 100 content transmission system
101 server
102, 103 terminal
110 home network
200 content transmission system
201 server
202, 203 terminal
210 home network
220 outside network
230 router
300 content transmission device (source device)
301 communication and control unit
302 content recording unit
303 content acquisition unit
304 content supply unit
305 content list supply unit
306 authentication and key-sharing unit
307 terminal management unit
308 content reproduction and output unit
400 content reception unit
401 communication and control unit
402 content list browsing unit
403 content acquisition unit
404 content decoding unit
405 content reproduction and output unit
406 authentication and key-sharing unit
407 input unit
408 content recording unit
2200 computer program delivery system
2210 server
2211 storage device
2212 communication device
2213 information notification device 2300 personal computer
2301 CPU
2302 RAM
2303 EEPROM
2304 display
2305 speaker
2306 large-capacity storage device
2307 I/O interface
2308 bus
2400 recorder
2401 system chip
2401a CPU
2401b coprocessor
2401c interface function unit
2401d bus
2402 large-capacity storage device
2403 RAM
2404 EEPROM
2405 wireless LAN chip
2406 tuner
2407 display
2408 speaker
2409 LAN port
2409A LAN cable
2500 network access server
2501 system chip
2501a CPU
2501b coprocessor
2501c interface function unit
2501d bus
2502 large-capacity storage device
2503 RAM
2504 EEPROM
2505 wireless LAN chip
2506 LAN port
2506A LAN cable

The invention claimed is:

1. A content transmission device, comprising:
circuitry configured to:
authenticate with at least a first content reception device of a plurality of content reception devices;
receive from the at least first content reception device, security strength information that indicates a first security strength of the at least first content reception device;
select, based on the security strength information, one of a first shared key or a second shared key;
transfer the one of the first shared key or the second shared key to the at least first content reception device, based on a transmission standard;
encrypt first content, based on a first encryption key generated from the one of the first shared key or the second shared key; and
transmit the encrypted first content to the at least first content reception device,
wherein the security strength information comprises an NS flag that indicates whether the at least first content reception device supports a first encryption scheme, and an ES flag that indicates whether the first security strength exceeds a threshold value.

2. The content transmission device according to claim 1, wherein the first shared key corresponds to second content,
wherein the second shared key corresponds to third content different from the second content, and
wherein the circuitry is further configured to:
authenticate with a second content reception device of the plurality of content reception devices and a third content reception device of the plurality of content reception devices;
transfer the first shared key to the second content reception device, based on a second security strength of the second content reception device that exceeds the threshold value; and
transfer the second shared key to the third content reception device, based on a third security strength of the third content reception device that is lower than the threshold value, and
encrypt the second content with a second encryption key generated from the first shared key; and
transmit the encrypted second content to the second content reception device.

3. The content transmission device according to claim 2, wherein the circuitry is further configured to:
encrypt the third content with a third encryption key generated from the second shared key; and
transmit the encrypted third content to the third content reception device.

4. The content transmission device according to claim 2, wherein the circuitry is further configured to generate the second encryption key, based on a second encryption scheme, and
wherein the second content reception device is compatible with the second encryption scheme.

5. The content transmission device according to claim 1, wherein the security strength information comprises a device certificate that includes an ES flag.

6. The content transmission device according to claim 1, wherein the security strength information includes a command that comprises the ES flag stored in a CAPABILITY field of a payload of the command.

7. The content transmission device according to claim 6, wherein the command further comprises the NS flag stored in the CAPABILITY field of the payload of the command, and
wherein the circuitry is further configured to determine the at least first content reception device supports an encryption scheme, based on the NS flag.

8. The content transmission device according to claim 7, wherein the circuitry is further configured to calculate an electronic signature from data of the CAPABILITY field, based on a secret key of the at least first content reception device, and
wherein the electronic signature accompanies the CAPABILITY field.

9. The content transmission device according to claim 7, wherein the circuitry is further configured to interrupt the authentication, based on:
presence of the ES flag in a device certificate sent from the at least first content reception device; and
absence of the NS flag in the command.

10. The content transmission device according to claim 1, wherein the circuitry is further configured to:
store, the NS flag that indicates compatibility of the content transmission device with a second encryption scheme, in a CAPABILITY field of a payload of a command; and
calculate an electronic signature from data of the CAPABILITY field based on a secret key of the content transmission device; and insert the electronic signature into the command such that the electronic signature accompanies the CAPABILITY field.

11. The content transmission device according to claim 1, wherein the transmission standard is one of Digital Transmission Content Protection (DTCP) or DTCP-IP (DTCP mapping to IP).

12. A content transmission method, comprising:
authenticating with at least a first content reception device of a plurality of content reception devices;
receiving from the at least first content reception device, security strength information that indicates a security strength of the at least first content reception device;
selecting, based on the security strength information, one of a first shared key or a second shared key;
transferring the one of the first shared key or the second shared key to the at least first content reception device, based on a transmission standard;
encrypting first content, based on a first encryption key generated from the one of the first shared key or the second shared key; and
transmitting the encrypted first content to the at least first content reception device,
wherein the security strength information comprises an NS flag that indicates whether the at least first content reception device supports an encryption scheme, and an ES flag that indicates whether the security strength exceeds a threshold value.

13. A content reception device, comprising:
circuitry configured to:
authenticate with a content transmission device;
receive a shared key from the content transmission device based on a transmission standard;
store an ES flag and an NS flag in a command;
transmit the command to the content transmission device;
receive, from the content transmission device, a response corresponding to the command;
determine a compatibility of the content transmission device with an encryption scheme, based on presence of the NS flag in the received response; and
acquire encrypted content from the content transmission device,
wherein the NS flag indicates whether the content reception device is compatible with the encryption scheme,
wherein the ES flag indicates whether the content reception device has a security strength greater than a threshold value, and
wherein the acquired content is content encrypted using an encryption key generated from the received shared key.

14. The content reception device according to claim 13, wherein the circuitry is further configured to store the NS flag in a CAPABILITY field of a payload of the command.

15. The content transmission device according to claim 14, wherein the circuitry is further configured to:
calculate an electronic signature from data of the CAPABILITY field, based on a secret key of the content transmission device; and
insert the electronic signature into the command such that the electronic signature accompanies the CAPABILITY field.

16. A content reception method, comprising:
in a content reception device:
authenticating with a content transmission device;
receiving a shared key from the content transmission device based on a transmission standard;
storing an ES flag and an NS flag in a command;
transmitting the command to the content transmission device;
receiving, from the content transmission device, a response corresponding to the command;
determining a compatibility of the content transmission device with an encryption scheme, based on presence of the NS flag in the received response; and
acquiring content from the content transmission device,
wherein the NS flag indicates whether the content reception device is compatible with the encryption scheme,
wherein the ES flag indicates whether the content reception device has a security strength greater than a threshold value, and
wherein the acquired content is content encrypted using an encryption key generated from the received shared key.

17. A non-transitory computer-readable medium having stored thereon computer-executable instructions for causing a computer to execute operations, the operations comprising:
authenticating with at least a first content reception device of a plurality of content reception devices;
receiving from the at least first content reception device, security strength information that indicates a security strength of the at least first content reception device;
selecting, based on the security strength information, one of a first shared key or a second shared key;
transferring the one of the first shared key or the second shared key to the at least first content reception device, based on a transmission standard;
encrypting first content, based on a first encryption key generated from the one of the first shared key or the second shared key; and
transmitting the encrypted first content to the at least first content reception device,
wherein the security strength information comprises an NS flag that indicates whether the at least first content reception device supports an encryption scheme, and an ES flag that indicates whether the security strength exceeds a threshold value.

18. A non-transitory computer-readable medium having stored thereon computer-executable instructions for causing a computer to execute operations, the operations comprising:
authenticating with a content transmission device;
receiving a shared key from the content transmission device based on a transmission standard;
storing an ES flag and an NS flag in a command;
send the command to the content transmission device;
receiving a response, corresponding to the command, from the content transmission device,
determining the content transmission device support an encryption scheme based on presence of the NS flag in the received response, and
acquiring content from the content transmission device.

19. A content transmission system, comprising:
at least one content reception device; and
a content transmission device configured to:
authenticate with the at least one content reception device;

receive from the at least one content reception device, security strength information that indicates a security strength of the at least one content reception device;
select, based on the security strength information, one of a first shared key or a second shared key;
transfer the one the first shared key or the second shared key to the at least one content reception device, based on a transmission standard;
encrypt content based on an encryption key generated from the one of the first shared key or the second shared key; and
transmit the encrypted content to the at least one content reception device,
wherein the security strength information comprises an NS flag that indicates whether the at least one content reception device supports an encryption scheme, and an ES flag that indicates whether the security strength exceeds a threshold value.

* * * * *